United States Patent
DeRosa et al.

(10) Patent No.: US 9,884,782 B2
(45) Date of Patent: Feb. 6, 2018

(54) TREATMENT OF GLASS SURFACES FOR IMPROVED ADHESION

(71) Applicant: Corning Incorporated, Corning, NY (US)

(72) Inventors: Rebecca Lee DeRosa, Painted Post, NY (US); Jiangwei Feng, Newtown, PA (US); James Patrick Hamilton, Horseheads, NY (US); James Robert Matthews, Painted Post, NY (US); Yasuyuki Mizushima, Shizuoka (JP); Hisanori Nakanishi, Hamamatsu (JP); Wanda Janina Walczak, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/301,595

(22) PCT Filed: Apr. 1, 2015

(86) PCT No.: PCT/US2015/023774
§ 371 (c)(1),
(2) Date: Oct. 3, 2016

(87) PCT Pub. No.: WO2015/153706
PCT Pub. Date: Oct. 8, 2015

(65) Prior Publication Data
US 2017/0015583 A1    Jan. 19, 2017

Related U.S. Application Data

(60) Provisional application No. 61/975,160, filed on Apr. 4, 2014.

(51) Int. Cl.
*B32B 3/00*     (2006.01)
*C03C 17/34*    (2006.01)
(Continued)

(52) U.S. Cl.
CPC .......... *C03C 17/3405* (2013.01); *C03C 27/00* (2013.01); *G02F 1/133512* (2013.01);
(Continued)

(58) Field of Classification Search
CPC ................ C03C 17/3405; C03C 27/00; C03C 2218/116; C03C 2218/151;
(Continued)

(56) References Cited

U.S. PATENT DOCUMENTS

| | | |
|---|---|---|
| 2,946,701 A | 7/1960 | Plueddemann |
| 3,338,696 A | 8/1967 | Dockerty |

(Continued)

FOREIGN PATENT DOCUMENTS

| | | |
|---|---|---|
| CN | 1692988 A | 11/2005 |
| CN | 1808187 A | 7/2006 |

(Continued)

OTHER PUBLICATIONS

Vig, John R. "UV/ozone cleaning of surfaces." Journal of Vacuum Science & Technology A 3.3 (1985): 1027-1034.
(Continued)

*Primary Examiner* — Elizabeth E Mulvaney

(57) ABSTRACT

A patterned article and a method of making the patterned article. The patterned article comprises a glass substrate and black matrix segments. The black matrix segments are in the form of a pattern and at least one of the segments has a line width of 8 μm or less. The article also comprises an adhesion agent positioned between the glass substrate and the black matrix segments. The adhesion agent provides at least one of: a total surface energy of 65 mN/m or less and at least a 30% reduction in surface polarity compared to a control untreated glass surface as determined by $H_2O$ and diiodomethane contact angle and application of the Wu model.

20 Claims, 4 Drawing Sheets

(51) Int. Cl.
*C03C 27/00* (2006.01)
*G02F 1/1335* (2006.01)
*G02F 1/1333* (2006.01)

(52) U.S. Cl.
CPC .. *G02F 1/133514* (2013.01); *G02F 1/133516* (2013.01); *C03C 2218/116* (2013.01); *C03C 2218/151* (2013.01); *G02F 2001/133302* (2013.01)

(58) Field of Classification Search
CPC ......... G02F 1/133521; G02F 1/133514; G02F 1/133516; G02F 2001/133302
See application file for complete search history.

(56) References Cited

U.S. PATENT DOCUMENTS

| | | |
|---|---|---|
| 3,682,609 A | 8/1972 | Dockerty |
| 4,102,664 A | 7/1978 | Dumbaugh, Jr. |
| 4,880,453 A | 11/1989 | Coppola et al. |
| 4,880,462 A | 11/1989 | Meyer-Grunow |
| 5,933,204 A | 8/1999 | Fukumoto |
| 5,998,090 A | 12/1999 | Sabnis et al. |
| 6,266,121 B1 | 6/2001 | Shigeta et al. |
| 6,325,550 B1 | 12/2001 | Hoffman et al. |
| 6,455,209 B1 | 9/2002 | Okaniwa et al. |
| 6,522,379 B1 | 2/2003 | Ishihara et al. |
| 6,992,008 B2 | 1/2006 | Kobayashi et al. |
| 7,050,130 B2 | 5/2006 | Sohn et al. |
| 7,537,867 B2 | 5/2009 | Chou |
| 7,879,390 B2 | 2/2011 | Salleo et al. |
| 2005/0001201 A1 | 1/2005 | Bocko et al. |
| 2006/0159843 A1 | 7/2006 | Sze et al. |
| 2007/0184362 A1 | 8/2007 | Kim et al. |
| 2008/0166641 A1 | 7/2008 | Kim et al. |
| 2008/0261129 A1 | 10/2008 | Cha et al. |
| 2009/0035535 A1 | 2/2009 | Wach I et al. |
| 2010/0112311 A1 | 5/2010 | Kobayashi et al. |
| 2010/0290143 A1 | 11/2010 | Kim et al. |
| 2011/0003241 A1 | 1/2011 | Kaneko et al. |
| 2011/0151379 A1 | 6/2011 | Choi et al. |
| 2013/0010237 A1 | 1/2013 | Fujiyama et al. |
| 2013/0129941 A1 | 5/2013 | Zhao et al. |
| 2013/0171566 A1 | 7/2013 | Shu et al. |

FOREIGN PATENT DOCUMENTS

| | | |
|---|---|---|
| CN | 100390644 C | 5/2008 |
| CN | 100464224 C | 2/2009 |
| CN | 101493600 A | 7/2009 |
| CN | 101526685 A | 9/2009 |
| CN | 101877299 A | 11/2010 |
| CN | 101995702 A | 3/2011 |
| CN | 102179397 A | 9/2011 |
| CN | 102681067 A | 9/2012 |
| CN | 202548485 U | 11/2012 |
| JP | 2001272522 A | 10/2001 |
| JP | 2003292657 A | 10/2003 |
| JP | 2006045634 A | 2/2006 |
| JP | 2010197567 | 9/2010 |
| JP | 2011122151 A | 6/2011 |
| WO | 2009067415 A1 | 5/2009 |
| WO | 2014080917 A1 | 5/2014 |

OTHER PUBLICATIONS

Diffraction measurements of crystalline morphology in a thermotropic random copolymer Polymer, vol. 34, Issue 2, pp. 227-237 D.J Wilson, C.G Vonk, A.H Windle.

Bauer et al; "Surface Tension, Adhesion and Wetting of Materials for Photolithographic Process"; J. Vac. Sci. Technol. B; 14 (4); Jul./Aug. 1996; pp. 2485-2492.

C.J. Van Oss, M.K. Chaudhury, R.J. Good, "Interfacial Lifshitz-van der Waals and polar interactions in macroscopic systems", Chemistry Reviews, 88 (1988) 927-940.

D.K. Owens, R.C. Wendt, "Estimation of the surface free energy of polymers", Journal of Applied Polymer Science, 13 (1969) 1741-1747.

Physical Chemistry of Surfaces, "Capillarity: Shape of Static Drops or Bubbles", Arthur W. Adamson, John Wiley and Sons, 1982, pp. 28-36.

Physical Chemistry of Surfaces, "The solid-liquid interface-contact angle: Theoretical Aspects of Contact Angle" Arthur W. Adamson, John Wiley and Sons, 1982, pp. 357.

S. Wu, "Calculation of interfacial tension in polymer systems", Journal of Polymer Science Part C: Polymer Symposia, 34 (1971) 19-30.

International Search Report of the International Searching Authority; PCT/US2015/023774; dated Jun. 16, 2015; 6 Pages; Korean Patent Office.

TREATMENT OF GLASS SURFACES FOR IMPROVED ADHESION

CROSS REFERENCE TO RELATED APPLICATIONS

This application claims the benefit of priority under 35 U.S.C. § 365 of International Patent Application Serial No. PCT/US15/23774 filed on Apr. 1, 2015 designating the United States of America, which in turn claims the benefit of priority under 35 U.S.C. § 119 of U.S. Provisional Application Ser. No. 61/975,160 filed Apr. 4, 2014 the content of which is relied upon and incorporated herein by reference in its entirety.

TECHNICAL FIELD

The present disclosure relates generally to patterned articles and more particularly to patterned articles comprising glass substrates and black matrix segments, wherein the black matrix segments are in the form of a pattern.

BACKGROUND

Display devices, especially a flat panel display such as a liquid crystal display (LCD) include a thin film transistor (TFT) in each pixel to drive the display device with each pixel having a dimensional size of several microns. Moreover, a plurality of pixels is arranged in a patterned matrix such as a grid-like structured pattern. Alternative light sources for flat panel displays include light-emitting diodes (LED) and the next generation organic light-emitting diodes (OLED). Like the pixel matrix, the LEDs are arranged in a patterned matrix. The light produced by each pixel or light-emitting diode is then directed to a color filter array that includes color filter units, e.g., red, green or blue (RGB) units. Like the pixels, the color filter array is also arranged in a patterned matrix such that each pixel is generally associated with an individual color unit.

One method for producing an LCD or LED color filter array involves utilizing an ink jet system to "print" RGB color inks into the individualized color units on a glass substrate. In this method, a polymer composition, hereafter, and at times referred to as "black matrix" is deposited onto a glass sheet in liquid form, pre-baked to evaporate solvents, patterned into an array of wells separated by raised walls by partially curing with ultraviolet light through a mask, developed with an alkaline solution to create the well array pattern, and then post-baked. The pattered glass substrate is then passed under an ink jet head, and very small quantities of colored ink are placed or printed into each of the wells to form the individualized RGB color units. The raised walls surrounding each well serve to contain the color filter ink printed into that well until the ink has dried, thereby preventing intermixing of the different colored inks.

The continuing demand for high picture quality, high resolution display devices will always require a greater density of pixels for a given area as well as black matrix patterns of smaller dimensions for the color filter array. There are, however, current technical limitations as to how small one can pattern black matrix in terms of line width without having the polymer material delaminate from the glass substrate during the development process. The current industry standard of black matrix line width is approximately 5 μm to 8 μm. However, display manufacturers are forever looking to increase display resolution, and therefore, there is a continued interest and technical objective to reduce black matrix line widths to 5 μm or less.

SUMMARY

Embodiments disclosed herein include a patterned article that comprises a glass substrate and black matrix segments. The black matrix segments are in the form of a pattern of wells which are separated by line segments having a width of less than 8 μm. The article also comprises an adhesion agent positioned between the glass substrate and the black matrix polymer. The adhesion agent provides at least one of: a total surface energy of the glass substrate of 65 mN/m or less; and at least a 30% reduction in surface polarity compared to a control untreated glass surface, as determined by water and diiodomethane contact angle measurements and application of the Wu model for calculation of surface energy.

Embodiments disclosed herein also include a method of improving the adhesion of black matrix to a glass substrate. The method comprises providing a glass substrate, and treating a surface of the glass substrate with an adhesion agent. The adhesion agent provides a total surface energy of the glass substrate of 65 mN/m or less as determined by water and diiodomethane contact angle measurements and application of the Wu model for calculation of surface energy. The method may also include at least a concomitant 35% reduction in surface polarity relative to an untreated surface. The method further comprises applying black matrix to the surface of the glass substrate that is treated with the adhesion agent, and then creating a pattern within the black matrix. The pattern includes line segments and at least one of the line segments has a width of less than 8 μm.

Embodiments disclosed herein may further include another method of improving the adhesion of black matrix to a glass substrate. The method comprises providing a glass substrate, and treating a surface of the glass substrate with an adhesion agent. The adhesion agent will increase the water contact angle of the glass surface to at least 40°. The method further comprises applying black matrix to the surface of the glass substrate that is treated with the adhesion agent, and then creating a pattern within the black matrix. The pattern includes line segments and at least one of the line segments has a width of less than 8 μm.

BRIEF DESCRIPTION OF THE FIGURES

The accompanying Figures, which are incorporated in and constitute a part of the specification, illustrate as follows.

DETAILED DESCRIPTION

Figure 1:
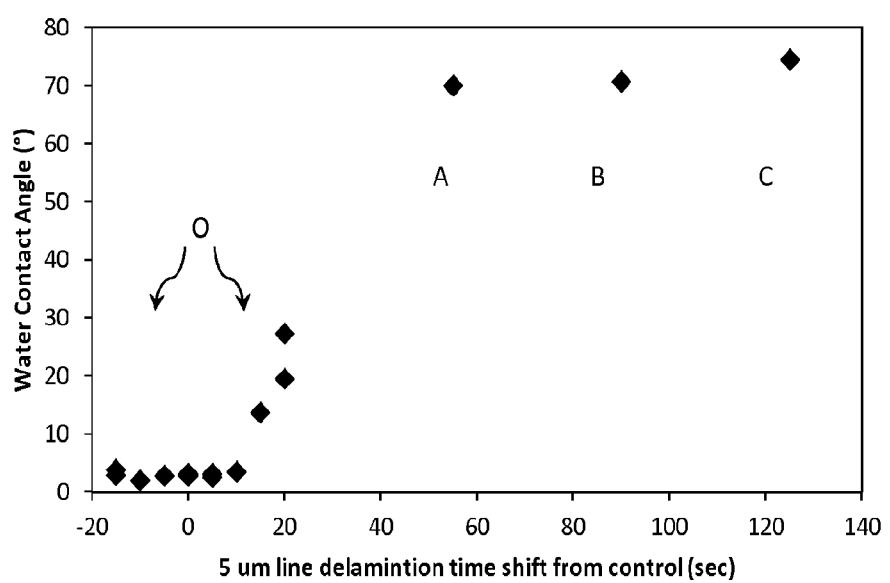
FIG. 1 is a graphical representation of different adhesion agents applied to a glass substrate, and an observed relationship in water contact angle of a treated surface of the substrate and the adhesive character between black matrix and the treated surface as demonstrated by delamination time in alkaline developer solution.

The commercial market for high resolution video displays is competitive, and display manufacturers are always looking to provide the next generation technology to their customers. There are, however, technical hurdles that must be addressed before greater resolution displays are brought to the market. One problem that display manufacturers experience in manufacturing ever smaller color filter arrays is delamination of black matrix from the surface of a glass substrate when the black matrix pattern contains line segments having widths below approximately 8 μm or 6 μm, and particularly below 5 μm. It is proposed that the delamination is the result of a development or wash step, e.g., an alkaline wash, in the lithographic process. Seepage of developer solution at the black matrix-glass interface can result in undercutting of the black matrix line segments as line widths are patterned below the current 5 μm to 8 μm industry standard. A modification of the surface properties of a glass substrate prior to the deposition of black matrix is one way to improve upon the adhesion or retention of black matrix line segments with narrow widths.

Described herein is a process to modify the surface properties of a glass substrate. The process can be used to modify the surface of a glass substrate that is to be used in the manufacture of a flat panel video display, e.g., in the making of a color filter array for a flat panel display. The flat panel displays or color filter arrays that can benefit from such a process can range from relatively small displays, e.g., camera and smart phone displays, to medium sized displays, e.g., tablets and laptops, and to relatively large displays, e.g., televisions. The glass substrates modified by the process described can be used to manufacture various types of displays including LCD, LED and OLED. In particular, the glass substrates modified by the process described can be used to manufacture a color filter array that is a required component for each of the above stated displays.

The process is directed to a glass substrate that is treated with an adhesion agent to modify the surface properties of the substrate. It is believed that the adhesion agent is used to "prime" the glass surface for deposition of black matrix, and therefore, improve upon the adhesion or retention properties of the black matrix material to the glass substrate. As stated, improved adhesion is required to minimize delamination of segments of patterned black matrix during the development process, particularly, if the black matrix pattern includes line segments with widths less than approximately 8 μm, and in many instances, line segments with widths less than 6 μm or less than 5 μm. Surface treatments that can be used to improve upon black matrix adhesion and retention of segment line widths of less than 8 μm are generally associated with organic-based adhesion agents that can impart greater hydrophobic character to a surface of a well-cleaned glass substrate, the latter of which is hydrophilic by nature. A glass surface with enhanced hydrophobic character is believed to enhance the interfacial compatibility of black matrix polymers that are also hydrophobic in character.

In one aspect, the application of an adhesion agent to a surface of a glass substrate can offer some chemical or physical interaction between the glass surface and the black matrix material. The degree of chemical bonding will depend on the specific organic functionality of the adhesion agent. In the case of a chemical interaction, one can use an adhesion agent having reactive functionality that can form a covalent bond with a component of the black matrix material as it is cured. Potential reactive functionality of an adhesion agent can include, but not be limited to, a vinyl or acrylate group, that can covalently bound with other vinyl or acrylate monomers or oligomers in a black matrix polymer composition. The ability of the adhesion agent to chemically interact with black matrix can also enhance the curing/polymerization of the black matrix polymer at or near the glass surface interface. In the case of a physical interaction, one can use an adhesion agent having relatively long, straight or branched, chains that can potentially penetrate into the black matrix material at or near the glass-black matrix interface prior to or during cure.

In another aspect, the application of an adhesion agent to a surface of a glass substrate can increase chemical resistance to the aqueous developer solution at the glass/black matrix interface. All of the above stated physical and chemical modifications incurred by treating a surface of a glass substrate with an adhesion agent can alone or in combination contribute to the observed improvement in minimizing the delamination of black matrix segments during the development process.

The term "treating" a surface of a glass substrate with an adhesion agent can include coating a glass substrate with the adhesion agent. In other words, the amount of adhesion agent used in treating a glass substrate can determine whether or not the adhesion agent would establish a coating. In some instances, a coating established by the application of an adhesion agent can be referred to as a prime coat for the glass substrate prior to the deposition of black matrix. In other instances, treating a surface of a glass substrate with an adhesion agent does not form a continuous coating. In other words, a surface of a glass substrate is spot treated with an adhesion agent, and so there are areas on the surface of the glass substrate that have no adhesion agent.

It must be noted that, as used in the specification and the appended claims, the singular forms "a," "an" and "the" include plural referents unless the context clearly dictates otherwise. Thus, for example, reference to "an adhesion agent" includes mixtures of two or more adhesion agents, and the like. "Optional" or "optionally" means that the subsequently described event or circumstance can or cannot occur, and that the description includes instances where the event or circumstance occurs and instances where it does not. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that throughout the application, data is provided in a number of different formats, and that this data, represents endpoints and starting points, and ranges for any combination of the data points. For example, if a particular data point "10" and a particular data point "15" are disclosed, it is understood that 10 and 15 are considered disclosed. It is also understood that each unit value between two particular unit values are also disclosed. For example, if 10 and 15 are disclosed, then 11, 12, 13, and 14 are also disclosed.

The described process provides an article patterned with black matrix. The article comprises: a glass substrate; patterned, black matrix segments; and an adhesion agent positioned between the glass substrate and the patterned black matrix segments. As stated, black matrix is in the form of a developed pattern that includes line segments, and at least one segment has a line width of 8 µm or less, for example in the range of 0.01 µm to 8 µm, 0.1 µm to 6 µm, 0.5 µm to 6 µm, 0.5 µm to 4 µm, or in the range of 0.5 µm to 3 µm. As stated above, it is an objective to reduce the relative degree of delamination of black matrix segments from a surface of a glass substrate by treating a surface of the glass substrate with an adhesion agent. Moreover, the problem associated with delamination of black matrix segments is generally associated with segments of black matrix with narrow line widths. Accordingly, the process is particularly helpful in forming segments of black matrix having a line width in the range of 1 µm to 4 µm, e.g., below the current industry standard line width. It is of course understood by a person of skill in the art that the described process will also improve upon the adhesion characteristics of the patterned segments with the surface of a glass substrate no matter what the line width, even current segments with line widths of 5 µm to 10 µm, e.g., 8 µm.

The segments of patterned black matrix can form a grid-like structure that includes segments oriented in a first direction and segments oriented in a second direction. The first and the second direction segments can intersect to form any angle of orientation in the range of 45° to 120°. For example, a simple grid-like structure would have an angle of orientation of about 90°, a triangular pattern would have an angle of orientation of about 60°, and a hexagonal pattern would have an angle of orientation of about 120°. Also, a person of skill would understand that the minimal line width of any one segment is limited by physical stability of the patterned black matrix on the glass substrate, particularly, as the black matrix is being developed. Accordingly, the line width of any one segment will likely have a minimum line width of 0.1 µm, more likely of 0.5 µm.

In many instances, and to take full advantage of the process described herein, the segments in a first direction or a second direction will have a line width that is not greater than 5 µm, and more likely not greater than 4.5 µm, not greater than 4.0 µm, not greater than 3.5 µm, not greater than 3.0 µm, not greater than 2.5 µm or not greater than 2.0 µm.

The use of contact angle analysis is an established method to determine surface energy of solid surfaces. One technique involves acquiring the contact angle between the surface and different probe liquids; the latter having well-defined surface energy components. Various models exist to approximate the surface energy based on a 2-fluid method. Those models include the Wu method, Owens-Wendt-Rabel-Kaelble method, and the van Oss method. The Wu method is described, for example, in S. Wu, "Calculation of interfacial tension in polymer systems", Journal of Polymer Science Part C: Polymer Symposia, 34 (1971) 19-30, the entire disclosure of which is incorporated herein by reference. The Owens-Rabel-Kaelble method is describe, for example, in D. K. Owens, R. C. Wendt, "Estimation of the surface free energy of polymers", Journal of Applied Polymer Science, 13 (1969) 1741-1747, the entire disclosure of which is incorporated herein by reference. The Van Oss method is described, for example, in C. J. Van Oss, M. K. Chaudhury, R. J. Good, "Interfacial Lifshitz-van der Waals and polar interactions in macroscopic systems", Chemistry Reviews, 88 (1988) 927-940, the entire disclosure of which is incorporated herein by reference. The values presented herein involve determination of dispersive, polar, and total surface energies using the Wu method, as set forth below. It is understood that the use of the other models may result in different absolute values for dispersive, polar and total surface energies.

Surface Energy Theory and Equations

List of Symbols

| | |
|---|---|
| $\gamma_l$ | Total surface energy of the liquid (mN/m) |
| $\gamma_s$ | Total surface energy of the solid (mN/m) |
| $\gamma_l^d$ | Dispersive surface energy component of the liquid (mN/m) |
| $\gamma_s^d$ | Dispersive surface energy component of the solid (mN/m) |
| $\gamma_l^p$ | Polar surface energy component of the liquid (mN/m) |
| $\gamma_s^p$ | Polar surface energy component of the solid (mN/m) |
| $\theta$ | Contact angle between the probe liquid/surface/air (°) |

The surface energy values presented herein are calculated using the Wu method to estimate the surface energy, using the following equation:

$$\gamma_l(\cos\theta + 1) = 4\left[\frac{\gamma_l^d \gamma_s^d}{\gamma_l^d + \gamma_s^d}\right]\left[\frac{\gamma_l^p \gamma_s^p}{\gamma_l^p + \gamma_s^p}\right]$$

Here it is understood that the total surface energy of the liquid and solid is the sum of the polar and dispersive components. In order to apply this model, we used water [$\gamma_l$=72.8 mN/m; $\gamma_l^d$=26.4 mN/m; $\gamma_l^p$=46.4 mN/m] and diiodomethane (DIM) [$\gamma_l$=50.8 mN/m; $\gamma_l^d$=50.8 mN/m; $\gamma_l^p$=0.0 mN/m] as probe liquids. Because DIM expresses dispersion forces only, the Wu model was used to first approximate the dispersive term for the surface; all polar components dropped out of the equation. Next, the surface energy and contact angle values for pure water were used along with the calculated dispersive term to approximate the polar component. Finally, the sum of the polar and dispersive terms provided the total surface energy.

Liquid surface energies can be determined by methods well known to those in the art including the pendant drop method, the du Nuoy ring method or the Wilhelmy plate method as described in Physical Chemistry of Surfaces, Arthur W. Adamson, John Wiley and Sons, 1982, pp. 28, the entire disclosure of which is incorporated herein by reference. A common method derived by Fowkes utilizes a combination of Wilhelmy plate and contact angle on PTFE to differentiate the polar and dispersive components of each liquid. Fowkes surface energy theory dictates that the dispersive component of the liquid [$\gamma_l^d$] can be determined from the total surface energy [$\gamma_l$] and the contact angle of the liquid on a PTFE surface [$\theta_{PTFE}$].

$$\gamma_l^d = \frac{\gamma_l^2(\cos\theta_{PTFE} + 1)^2}{72}$$

The polar and nonpolar components of the surface energy can then be used to calculate the interfacial energy by the method of Fowkes as described in Physical Chemistry of Surfaces, Arthur W. Adamson, John Wiley and Sons, 1982, pp. 357, the entire disclosure of which is incorporated herein by reference, and the following equation:

$\gamma_{ij} = \gamma_i + \gamma_j - 2(\gamma_i^d \gamma_j^d)^{1/2} - 2(\gamma_i^p \gamma_j^p)^{1/2}$ Here $\gamma_{ij}$ is the interfacial tension between components i and j, $\gamma_i$ is the surface energy of i, $\gamma_i^d$ is the dispersive component of the surface energy of i, and $\gamma_i^p$ is the polar component of the surface energy of i, $\gamma_j$ is the surface energy of j, $\gamma_j^d$ is the dispersive component of the surface energy of j, and $\gamma_j^p$ is the polar component of the surface energy of j.

Accordingly, one can determine the surface properties of a non-treated (control) glass substrate as well as the surface properties of a glass substrate treated with an adhesion agent by measuring water and DIM contact angles of each substrate using any one of the surface energy models described above.

The propensity for a black matrix segment to delaminate from a glass substrate in the presence of a developing or wash solution can be described by a quality factor f, which is the ratio of the work of adhesion ($W_{l12}$) between the black matrix material and the glass substrate in the presence of a developing solution (l) to the work of adhesion ($W_{a12}$) between the black matrix material and the glass substrate in air, as described by $$f = \frac{W_{l12}}{W_{a12}}$$

See, Bauer, Drescher and Illig, "Surface Tension, adhesion and wetting of materials for the photolithographic process" Journal of Vacuum Science and Technology, B, 14, 2485, (1996), the entire disclosure of which is incorporated herein by reference. Work of adhesion in air is based on the surface energies of the black matrix material ($\gamma_1$) and the glass substrate ($\gamma_2$), and their interfacial tension ($\gamma_{12}$). Work of adhesion in a liquid ($\gamma_3$), such as the developing solution is based on the interfacial tension of the black matrix material and liquid ($\gamma_{13}$), the interfacial tension of the glass substrate and the liquid ($\gamma_{23}$), and the interfacial tension between black matrix and glass substrate ($\gamma_{12}$).

$$W_{a12} = \gamma_1 + \gamma_2 - \gamma_{12}$$

$$W_{l12} = \gamma_{13} + \gamma_{23} - \gamma_{12}$$

$$\gamma_{ij} = \gamma_i + \gamma_j - 4\left[\frac{\gamma_i^d \gamma_j^d}{\gamma_i^d + \gamma_j^d} + \frac{\gamma_i^p \gamma_j^p}{\gamma_i^p + \gamma_j^p}\right]$$

From the discussion above, one must also recognize that the particular solution utilized to develop the black matrix pattern will also affect the black matrix delamination behavior.

Adhesion Agents

The adhesion agent used in the process will possess a dual adhesive or attractive functionality meaning that one portion of the agent is attractive to the glass substrate and another portion of the agent is attractive to the black matrix material. We know that a clean pristine surface of a glass substrate includes silicon-oxide or silicon-hydroxy groups at or near the surface. Accordingly, a surface of a glass substrate is generally considered to have some degree of hydrophilic character. We also know that the black matrix materials commonly used in the flat panel display industry are generally organic polymers that are deposited as a film on a glass substrate, overlaid with a photo mask and then cured or crosslinked. The black matrix composition is thus considered to have some degree of hydrophobic character.

Accordingly, an adhesion agent will generally have a regional or group functionality that is considered to be more hydrophilic as well a regional or group functionality that is considered to be more hydrophobic. It is to be understood that the terms "hydrophilic" and "hydrophobic" are well known terms that are used by scientists on a relative comparative scale, and refers to how well a particular compound, or more importantly a surface, repels or attracts water. One physical test method a scientist can use to help quantify a relative degree of hydrophilic/hydrophobic character of a particular surface is by measuring the water contact angle of the surface.

Fatty Chain Functional Organics

One class of adhesion agents can be referred to as a fatty chain, functional organic agent. A fatty chain functional organic agent will have an alkyl portion that includes from six to thirty carbon atoms, and a functional group. The alkyl portion would be attracted to the black matrix and the functional group would be attracted to a surface of a glass substrate. In theory, the fatty chain, functional organic agent would physically or chemically interact with both the black matrix and the glass substrate to enhance the attraction of the black matrix to the glass substrate at the black matrix-glass interface. The alkyl portion is believed to extend from a surface of the glass substrate and interact with the black matrix. The functional group is generally associated as polar in character, meaning the functional group would be attracted to a hydrophilic surface of the glass. The functional group(s) of the fatty chain include, but are not limited to, an amine, an alcohol, an epoxy, an acid or a siloxane. Accordingly, the adhesion agent is a fatty chain, functional organic agent selected from the group consisting of ($C_6$-$C_{30}$)alkyl amine, ($C_6$-$C_{30}$)alkyl alcohol, ($C_6$-$C_{30}$)alkyl acid, and ($C_6$-$C_{30}$)alkyl siloxane. A ($C_6$-$C_{30}$)alkyl acid includes, but is not limited to, carboxylic acids, organic sulfonic acids, and organic phosphonic acids. The term "siloxane" can be defined by group formula

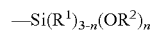

$$-Si(R^1)_{3-n}(OR^2)_n$$

wherein $R^1$ is an alkyl or lower alkyl; $R^2$ is a lower alkyl and n is 1, 2. Also, it is understood by a person of skill in the art that because many of the siloxane-based adhesion agents are prepared as aqueous solutions, see e.g., Example 3, one would expect at least some hydrolysis of the alkoxy substituents in such a preparation prior to contact with the glass substrate.

The term "alkyl" as used herein is a linear or branched saturated hydrocarbon of 1 to 30 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from 1 to 5 carbon atoms. Some examples of lower alkyls include, but not limited to, methyl, ethyl, propyl, iso-propyl, and n-butyl. Accordingly, a ($C_6$-$C_{30}$) alkyl is an alkyl group with six to thirty carbon atoms.

2. Substituted Alkyl Silanes

A substituted alkyl silane is similar in structure to an alkyl siloxane referred to above with the exception that the alkyl is also substituted with one or more organic functional groups selected from the group consisting of amino, ammonium, hydroxyl, ether and carboxylic acid. In many instances, the substituted alkyl silane is substituted with an organic functional group positioned at a terminal end of the alkyl group or anywhere along or within the alkyl chain. Also, in many instances the substituted alkyl is a substituted lower alkyl. Some exemplary substituted lower alkyl silanes include, but are not limited to, γ-aminopropyltriethoxy silane, γ-aminopropytrimethoxy silane, β-aminoethyltriethoxy silane, and δ-aminobutyltriethoxy silane. A substituted alkyl silane of particular interest will include one or more functional groups selected from the group consisting of quaternary nitrogen, ether and thioether. In many, instances, the substituted alkyl silane includes a pendant ($C_6$-$C_{30}$) alkyl that extends from the functional group. Of particular interest is a substituted alkyl silane with a quaternary nitrogen and having a pendant ($C_{10}$-$C_{24}$) alkyl. An exemplary substituted alkyl silane of interest is N,N-dimethyl-N-(3-(trimethoxysilyl)propyl)octadecan-1-ammonium chloride, often abbreviated herein as YSAM C18, the chemical structure of which is indicated below. YSAM C14 and YSAM C1 are also represented below. YSAM C18 has a pendant ($C_{18}$)alkyl off a quaternary nitrogen. Likewise, YSAM C14 has a pendant ($C_{14}$)alkyl off a quaternary nitrogen.

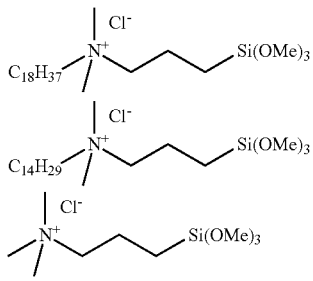

3. Bridged Disilane

Another class of adhesion agent includes bridged disilanes. A bridged disilane will have a general formula I $$(R^2)_3Si\text{—}X\text{—}Si(R^2)_3 \quad \quad I$$

wherein $R^2$ is a lower alkyl, X is NH or O. A class of bridged disilanes are referred to as disilazanes where X is NH.

4. Other Silane Agents

There are also some proprietary silane-based compounds that improve the adhesion characteristics of the black matrix to a glass substrate. As with the other adhesion agents, the proprietary silane-based compounds can reduce the overall surface energy of the glass substrate to below 65 mN/m and reduce the polar component of the surface energy by at least 30%.

5. Reactive Functional Silanes

Another class of adhesion agent can be referred to as a reactive functional alkyl silane. A reactive functional alkyl silane is similar to an alkyl silane described above with the exception that the alkyl portion of the compound includes a site of reactive functionality, which in theory can participate in a covalent chemical reaction, e.g., as a crosslink, with black matrix. As understood by those in the photolithographic art, a black matrix material can include one or more acrylic polymers that can form a chemical bond with the functional site of the silane following a thermal or photo cure. Like the acrylic black matrix material, the functional silane can comprise like reactive functionality, e.g., vinyl, acrylic, epoxide, that can possibly react with a component of the black matrix. Again, the silane portion of the functional silane is believed to have some attraction or interaction to a surface of the glass substrate.

One type of functional silane is an alkyl silane containing an epoxy group. An epoxy silane refers to compounds that on the one hand possess at least one epoxy ring and at the same time display groups that form silanol structures under hydrolysis conditions. A more general description of epoxy silanes and a method of making these compounds is provided in U.S. Pat. No. 2,946,701. These are compounds having the general formula (II) or (III):

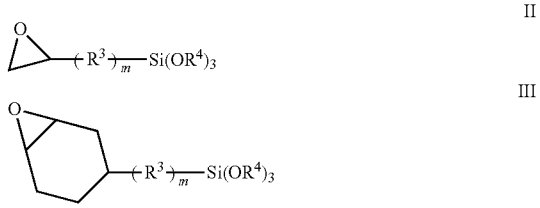

wherein $R^3$ is a divalent hydrocarbon radical with a maximum of twelve carbon atoms and the hydrocarbon radical optionally includes an ether linkage, e.g., —$CH_2OCH_2CH_2CH_2$—; $R^4$ is a lower alkyl; and m is an integer from 1 to 10. Particularly preferred epoxy silanes are such compounds in which $R^4$ is methyl or ethyl. Exemplary epoxy silanes include, but are not limited to, 3-glycidyl oxypropyl trimethoxysilane and 2-(3,4-epoxycyclohexyl) ethyl trimethoxysilane.

Another type of functional silane is a vinyl silane, a compound having a silane group and an alkyl vinyl group, i.e., an alkyl with at least one carbon-carbon double bond. In theory, the compound is attracted to the surface of a glass substrate by the silane group, and binds to the through the vinyl functionality, thereby improving the adhesion between the black matrix material and the glass substrate. One exemplary compound is prepared from the reaction of bis-3-(aminopropyl) tetramethylsiloxane and glycidyl methacrylate.

Still another type of functional silane is one with a functional (meth)acryloyl group that is connected to a polysiloxane chain through a divalent organic radical. Specific examples of these compounds are represented by general formula IV.

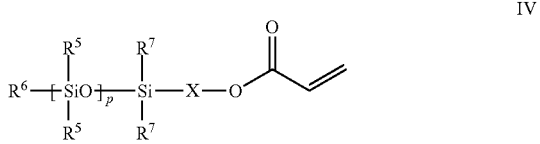

wherein $R^5$, $R^6$ and $R^7$ are independently selected from a lower alkyl; p is an integer from 3 to 20; X represents a divalent connecting group, and specifically represents a connecting chain represented by the formulas: $CH_2CH(OH)$ $CH_2$—, —$(CH_2)_n NHCH_2CH(OH)CH_2$—, —$(CH_2)_n$, —$(CH_2)_n$—O—$(CH_2)_m$— or —$OCH_2CH(OH)CH_2$—, and n and m respectively represent an integer from 2 to 6.

6. Functional Polymers

Another class of adhesion agent is commonly referred to as a functional polymer. The term "polymer" as used herein includes a homopolymer (a polymer prepared form a single monomer) and a copolymer (a copolymer prepared from at least two monomers). The term "polymer" also makes no reference to the number average molecular weight ($MW_n$) of the polymer, and so includes polymers with very large $MW_n$ as well as very small $MW_n$ polymers (i.e., oligomers), and those polymers having a $MW_n$ that falls in between.

In one embodiment, a functional polymer will have a diblock structure AB where A is a hydrophobic block and B is a hydrophilic block. The term "amphiphilic polymer" is also commonly used to describe such a polymeric structure. Exemplary hydrophilic blocks of a functional polymer can be prepared from a variety of known hydrophilic polymers including, but not limited to, cellulose, polysaccharide, polyvinyl alcohol, polycarboxylic acid, poly(meth)acrylic acid, polyethylenglycols (PEG), polyamides, polyacrylic amides, polyhydroxyethylmethacrylate (HEMA), polyethyleneglycol(meth)acrylate, and polyethoxypolyethyleneglycol (meth)acrylate, As used herein (meth)acrylate refers to an acrylate and the corresponding methacrylate.

The hydrophilic block(s) in the amphiphilic block copolymers may also be prepared from different monomers, or oligomers, for example the monomer or oligomers used for the preparation of the above mentioned hydrophilic polymer blocks, or monomers selected from acrylic acid, maleic acid, hydroxyethylmethacrylate (HEMA), polyethyleneglycol (meth)acrylate, ethoxypolyethyleneglycol (meth)acrylate, methoxyethyl (meth)acrylate, ethoxy (meth)acrylate, 2-dimethylamino-ethyl(meth)acrylate (DMAEMA).

Likewise, exemplary hydrophobic blocks of a functional polymer can be prepared from known hydrophobic monomers including, but not limited to, monovinyl aromatic monomers such as styrene and alpha-alkyllstyrenes, and other alkylated styrenes, or alkyl (meth)acrylic esters, or vinyl esters. Alternatively, the A block may be prepared from ethylenically unsaturated monomers chosen from butadiene, vinyl esters such as vinyl acetate, vinyl versatate and vinyl propionate. The term "alkyl (meth)acrylic esters" can include methyl (meth)acrylate, ethyl (meth)acrylate, propyl (meth)acrylate, n-butyl (meth)acrylate, isobutyl (meth)acrylate, 2-ethylhexyl (meth)acrylate, lauryl (meth)acrylate, and t-butyl (meth)acrylate. In addition, hydrophobic block(s) of the amphiphilic polymer can be prepared with vinyl unsaturated aliphatic hydrocarbon monomers comprising from 1 to 6 carbon atoms such as polybutylene and polyisobutylene.

In another embodiment, a functional polymer is a polyalkylleneimine. For example, a polyethyleneimines can be prepared either by ring-opening polymerization of acyl-substituted oxazolines, with subsequent hydrolysis, or by cationically initiated polymerization of ethyleneimine (aziridine), the former case producing a linear polyethyleneimine and the latter case producing its branched counterpart. Polyethyleneimines are available commercially, an example being Lupasol® G20 water-free, Lupasol® FG, or Lutensol® FP 620 precursor from BASF.

7. Surfactants

Another class of adhesion agent is commonly referred to as a surfactant. Surfactants are generally classified an anionic surfactant, a cationic surfactant, a nonionic surfactant, and an amphoteric surfactant. The class of amphoteric surfactants is of particular interest. An amphoteric surfactant of particular interest is represented by formula V.

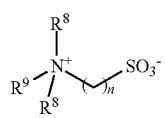

V wherein $R^9$ is an alkyl group having from 8 to 24 carbon atoms, preferably an alkyl group having from 8 to 14 carbon atoms, $R^8$ is an alkyl group having from 1 to 4 carbon atoms, and with methyl being preferred, and n is 1, 2, 3, 4, or 5. An example of a preferred compound is N-decyl-N,N-dimethyl-3-ammonio-1-propane-sulfonate, more commonly referred to as sulfobetaine 3-10.

Another amphoteric surfactant of interest is an alkylamido betaine of formula VI.

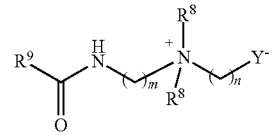

VI wherein $R^8$ and $R^9$ is defined above as in formula VI, and m and n is independently selected from 1, 2, 3, 4 or 5, and Y is —$SO_3$ or —C(O)O. The alkylamido betaines of interest include, but not limited to, cocoamidopropyl dimethyl betaine and lauroyl amidopropyl dimethyl betaine.

In one aspect, when the surfactant is an anionic surfactant, the anionic surfactant comprises an alkyl aryl sulfonate, an alkyl sulfate, or sulfated oxyethylated alkyl phenol. Examples of anionic surfactants include, but are not limited to, sodium dodecylbenzene sulfonate, sodium decylbenzene sulfonate, ammonium methyl dodecylbenzene sulfonate, ammonium dodecylbenzene sulfonate, sodium octadecylbenzene sulfonate, sodium nonylbenzene sulfonate, sodium dodecylnaphthalene sulfonate, sodium hetadecylbenzene sulfonate, potassium eicososyl naphthalene sulfonate, ethylamine undecylnaphthalene sulfonate, sodium docosylnaphthalene sulfonate, sodium octadecyl sulfate, sodium hexadecyl sulfate, sodium dodecyl sulfate, sodium nonyl sulfate, ammonium decyl sulfate, potassium tetradecyl sulfate, diethanolamino octyl sulfate, triethanolamine octadecyl sulfate, amrnmonium nonyl sulfate, ammonium nonylphenoxyl tetraethylenoxy sulfate, sodium dodecylphenoxy triethyleneoxy sulfate, ethanolamine decylphenoxy tetraethyleneoxy sulfate, or potassium octylphenoxy triethyleneoxy sulfate.

Examples of nonionic surfactants include, but are not limited to, the condensation product between ethylene oxide or propylene oxide with propylene glycol, ethylene diamine, diethylene glycol, dodecyl phenol, nonyl phenol, tetradecyl alcohol, N-octadecyl diethanolamide, N-dodecyl monoethanolamide, polyoxyethylene sorbitan monooleate, or polyoxyethylene sorbitan monolaurate. Other known nonionic surfactants include a class of surfactants based on blocks of polyalkylene oxide-polyethylene oxide such as the common Pluronic® series of surfactants based on alternating blocks of polypropylene oxide (A-block))-polyethylene oxide (b-block) having the structure BAB or ABA. Another example of a nonionic surfactant is an ethoxylated amine surfactant comprising a hydrophobic tail, e.g., a long chain alkyl or a corresponding partially unsaturated long chain alkene, and hydrophilic tail(s) of polyethylene oxide.

Examples of cationic surfactants include, but are not limited to, ethyl-dimethylstearyl ammonium chloride, benzyl-dimethyl-stearyl ammonium chloride, benzyldimethylstearyl ammonium chloride, trimethyl stearyl ammonium chloride, trimethylcetyl ammonium chloride, dimethylethyl dilaurylammonium chloride, dimethyl-propyl-myristyl ammonium chloride, or the corresponding bromide, methosulfate or acetate.

The process of manufacturing an upper plate of a light display including the making of a conventional color filter array is well known. The method of making a color filter array for a display device includes the steps of plating or depositing a polymeric black matrix ink on a surface of a glass substrate, and patterning the ink so as to form patterned segments on the glass substrate. The pattern step typically requires applying a pre-defined photo mask atop of the deposited ink and photo curing exposed portions of the ink. The non-exposed portions of the ink are then removed using one or more developing solutions, and a likely water rinse step, to form a grid pattern of micron-sized wells. Each of the wells is then filled with ink, e.g., using an ink-jet printing process, in alternating colors of red, green and blue forming a color filter on the glass substrate. Any method of ink deposition can be used including a dyeing method, a dispersion method, a spread method, a print method, an ink-jet print method, or the like. The grid-typed structure of the black matrix pattern divides each color of the color filter into pixel units on a plane. A protective transparent layer can then be deposited over the color filter grid to maintain the physical integrity of the color filter array. As an example, a brief description of forming a color array using the pigment dispersion method or the inkjet print method is described in U.S. Pat. No. 7,050,130 assigned to LG Electronics Inc.

Application of Adhesion Agent to Glass Substrate

The adhesion agent can be applied to the surface of a glass substrate using techniques known in the art. For example, the adhesion agent can be applied to a surface of the glass by spraying, dipping, meniscus coating, flood coating, rollers, brushes, etc. In one aspect, the adhesion agent is applied by spraying since the agent can be applied in a spraying station as glass substrates typically move in a production line in the manufacturing process. In one embodiment, the adhesive agent is applied in a continuous horizontal conveyance system or a continuous vertical conveyance system, where the glass substrate is oriented in a horizontal (parallel), vertical (perpendicular) or at any line angle in between. The temperature of the glass substrate at the time the adhesion agent is applied can be in the range of from about 10° C. to 300° C. Typically, the adhesion agent is applied to the surface of the glass at a temperature in the range of from about 20° C. to 80° C., e.g., at or near room temperature. In one aspect, the adhesive agent is applied to the surface of a glass substrate at or about room temperature, and after the glass surface has been sized, cleaned with various detergents, rinsed and optionally dried. See, below and Examples.

In another aspect, the adhesive agent can be applied to a surface of a glass substrate at a temperature near or above 175° C., near or above 200° C., or near or above 250° C., where the temperature of the glass is preferably measured with an infrared detector of the type commonly used in the art. Application of the adhesive agent at this point in the manufacturing process can be advantageous because the glass is virtually free of contaminants, or the adhesive agent could protect the glass during the remainder of the manufacturing process. In certain aspects, the glass surface may need to be cleaned prior to the application of the adhesion agent. This cleaning can be accomplished by various means including chemical cleaning methods known in the art and pyrolysis. The objective of these methods is to expose the hydroxyl groups and siloxane bonds in the glass. The following cleaning techniques can be used to remove adsorbed organic molecules from the glass surface. In one aspect, the glass can be cleaned with an aqueous detergent such as, for example, SemiClean KG obtained from Yokohama Oils and Fats. In another aspect, UV/ozone cleaning can be used to clean the glass. UV/ozone cleaning is carried out with a low pressure mercury lamp in an atmosphere containing oxygen. UV/ozone cleaning is described, for example, in Vig et al., J. Vac. Sci. Technol. A 3, 1027, (1985), the contents of which are incorporated herein by reference. A low pressure mercury grid lamp from BHK (88-9102-20) mounted in a steel enclosure filled with air is suitable for carrying out this cleaning method. The surface to be cleaned may be placed about 2 cm from the lamp, which may be activated for about 30 minutes, after which the glass surface is clean and ready for the application of the adhesion agent.

Again, depending upon the amount of adhesion agent that is used to treat a glass substrate per given surface area, and the type of adhesion agent used in the process, one can envision the deposition of a coating of adhesion agent. In such an instance, following an appropriate drying step, the coating produced on the surface of the glass substrate will have thickness that will vary from 0.1 nm to 3 µm, 1 nm to 1 µm, or 1 nm to 0.5 µm. The glass can be rinsed after the adhesion agent has been applied after the drying step. For example, this rinsing can remove the bulk of any excess adhesion agent.

According to various embodiments, the adhesion agent may also be applied using a plasma deposition method, wherein the plasma comprises, for example, at least one hydrocarbon component. For instance, the plasma may be scanned over the surface of the glass substrate using any method or device known in the art, e.g., a plasma jet or torch, such that the surface comes into contact with one or more of the components making up the plasma, such as the at least one hydrocarbon component.

As used herein, the terms "plasma," "atmospheric plasma," and variations thereof are intended to denote a gas that passes through an incident high frequency electric field. Encountering the electromagnetic field produces ionization of the gas atoms and frees electrons which are accelerated to a high velocity and, thus, a high kinetic energy. Some of the high velocity electrons ionize other atoms by colliding with their outermost electrons and those freed electrons can in turn produce additional ionization, resulting in a cascading ionization effect. The plasma thus produced can flow in a stream and the energetic particles caught in this stream can be projected toward an object, e.g., the glass substrate.

The plasma can, in various embodiments, be an atmospheric pressure (AP) plasma and a thermal or non-thermal plasma, such as CVD in vacuum condition. For example, the temperature of the plasma can range from room temperature (e.g., approximately 25° C.) to higher temperatures, such as up to about 300° C. By way of non-limiting example, the temperature of the plasma can range from about 25° C. to about 300° C., such as from about 50° C. to about 250° C., or from about 100° C. to about 200° C., including all ranges and subranges therebetween. The plasma can comprise at least one gas chosen from argon, helium, nitrogen, air, hydrogen, water vapor, and mixtures thereof, to name a few. According to some embodiments, argon can be employed as the plasma gas.

In non-limiting embodiments, the plasma may also comprise at least one hydrocarbon, which may be present in the form of a gas. Suitable hydrocarbons may include, but are not limited to, $C_1$-$C_{12}$ hydrocarbons, such as methane, ethane, propane, butane, pentane, hexane, heptane, octane, nonane, decane, undecane, dodecane, phenyl, double bond or trip bond hydrocarbon and combinations thereof, to name a few. According to various embodiments, volatile hydrocarbons with low boiling points (e.g., less than 100° C.) may be used, for example, $C_1$-$C_6$ hydrocarbons. In still further embodiments, the hydrocarbon can be methane or ethane.

The plasma can comprise, for instance, from about 1% to about 20% by volume of the at least one hydrocarbon, such as from about 2% to about 18%, from about 3% to about 15%, from about 4% to about 12%, from about 5% to about 10%, or from about 6% to about 8%, including all ranges and subranges therebetween. The plasma should also comprise at least organics that has fluorine in hydrocarbon chain, such as fluorine-containing organics as described elsewhere herein.

Contact between the plasma and the glass surface can be achieved using any suitable means known in the art, for example, a plasma jet or torch can be used to scan the surface of the glass substrate. The scan speed can be varied as necessary to achieve the desired coating density and/or efficiency for a particular application. For example, the scan speed can range from about 5 mm/s to about 100 mm/s, such as from about 10 mm/s to about 75 mm/s, from about 25 mm/s to about 60 mm/s, or from about 40 mm/s to about 50 mm/s, including all ranges and subranges therebetween.

The residence time, e.g. time period during which the plasma contacts the glass surface can likewise vary depending on the scan speed and the desired coating properties. By way of a non-limiting example, the residence time can range from less than a second to several minutes, such as from about 1 second to about 10 minutes, from about 30 seconds to about 9 minutes, from about 1 minute to about 8 minutes, from about 2 minutes to about 7 minutes, from about 3 minutes to about 6 minutes, or from about 4 minutes to about 5 minutes, including all ranges and subranges therebetween. In various embodiments, the glass surface can be contacted with the plasma in a single pass or, in other embodiments, multiple passes may be employed, such as 2 or more passes, 3 or more passes, 4 or more passes, 5 or more passes, 10 or more passes, 20 or more passes, and so on.

Prior to contact with the plasma, the glass substrate may be processed using one or more optional steps, such as polishing, finishing, and/or cleaning the surface(s) or edge(s) of the glass substrate.

Glass Substrate

The glass substrate can be formed by several different processes, including float processes, slot-draw processes, and fusion draw processes. See, for example, U.S. Pat. Nos. 3,338,696 and 3,682,609. In the slot-draw and fusion draw processes, the newly-formed glass sheet is oriented in a vertical direction. One preferred glass substrate is commonly referred to as 7059 glass manufactured by Corning Incorporated. The 7059 glass has a small coefficient of thermal expansion, is superior in dimensional stability and workability at relatively high processing temperatures and contains little, if any, alkali component in the glass. Preferred glass substrates, may, for example, include the Eagle XG® and Lotus® families of display glasses manufactured by Corning Incorporated. Glass substrates of particular interest to the described include high performance glass substrates, such as those manufactured by Corning Incorporated. The glass substrates are specifically designed to be used in the manufacture of flat panel displays and preferably exhibit densities of less than 2.45 g/cm$^3$ and a liquidus viscosity (defined as the viscosity of the glass at the liquidus temperature) greater than about 200,000 poises, preferably greater than about 400,000 poises, more preferably greater than about 600,000 poises, and most preferably greater than about 800,000 poises. Additionally, the glass substrates preferably exhibit linear coefficients of thermal expansion over the temperature range of 0 to 300° C. of 28-35×10$^{-7}$/° C., or of 28-33×10$^{-7}$/° C., and strain points higher than about 650° C. The glass substrate preferably have a melting temperature less than 1700° C. In addition, the glass substrate preferably exhibits a weight loss of less than 0.5 mg/cm$^2$ after immersion in a solution of 1 part HF$_{(aq)}$ (50 wt. %) and 10 parts NH$_4$F$_{(aq)}$ (40 wt. %) for 5 minutes at 30° C.

In one implementation of the described process, the glass substrate will have the following composition. The major components of the glass are SiO$_2$, Al$_2$O$_3$, B$_2$O$_3$, and at least two alkaline earth oxides, i.e., MgO, CaO, SrO and/or BaO. The SiO$_2$ serves as the basic glass former of the glass. Its concentration should be greater than 64 mole percent in order to provide the glass with a density and chemical durability suitable for a flat panel display glass, e.g., an AMLCD glass, and a liquidus temperature (liquidus viscosity) which allows the glass to be formed by a downdraw process (e.g., a fusion process) described in more detail below. The glass substrate will preferably have a density less than or equal to 2.45 grams/cm$^3$, or less than or equal to 2.41 g/cm$^3$, a weight loss which is less than or equal to 0.8 mg/cm$^2$ when a polished sample is exposed to a 5% HCl$_{(aq)}$ solution for 24 hours at 95° C., and a weight loss of less than 0.5 mg/cm$^2$ when exposed to a solution of 1 volume of 50 wt. % HF$_{(aq)}$ and 10 volumes 40 wt. % NH$_4$F$_{(aq)}$ at 30° C. for 5 minutes.

In terms of an upper limit, the SiO$_2$ concentration should be less than or equal to 71 mole percent to allow batch materials to be melted using conventional, high volume, melting techniques, e.g., Joule melting in a refractory melter. Preferably, the SiO$_2$ concentration is between 66.0 and 70.5 mole percent, between 66.5 and 70.0 mole percent, or between 67.0 and 69.5 mole percent. As a result of their SiO$_2$ content, the glasses of the invention typically have melting temperatures greater than or equal to 1600° C. Al$_2$O$_3$ is another glass former of the glasses of the invention. An Al$_2$O$_3$ concentration greater than or equal to 9.0 mole percent provides the glass with a low liquidus temperature and a corresponding high liquidus viscosity. The use of at least 9.0 mole percent Al$_2$O$_3$ also improves the glass' strain point and modulus. In order to achieve an RO/[Al$_2$O$_3$] (RO are oxides of Group IIA elements in the periodic table) ratio greater than or equal to 1.00 (see below), the Al$_2$O$_3$ concentration needs to be kept below 12.0 mole percent. Preferably, the Al$_2$O$_3$ concentration is between 9.5 and 11.5 mole percent. B$_2$O$_3$ is both a glass former and a flux that aids melting and lowers the melting temperature. To achieve these effects, the glasses of the invention have B$_2$O$_3$ concentrations that are equal to or greater than 7.0 mole percent. Large amounts of B$_2$O$_3$, however, lead to reductions in strain point (approximately 10° C. for each mole percent increase in B$_2$O$_3$ above 7.0 mole percent), modulus, and chemical durability.

The glass substrate will preferably have a strain point equal to or greater than 650° C., equal to or greater than 655° C., or equal to or greater than 660° C.), a Young's modulus equal to or greater than 10.0×10$^6$ psi (more preferably, and a chemical durability as described above in connection with the discussion of the SiO$_2$ content of the glass. A high strain point is desirable to help prevent panel distortion due to compaction/shrinkage during thermal processing subsequent to manufacturing of the glass. A high Young's modulus is desirable since it reduces the amount of sag exhibited by large glass sheets during shipping and handling.

In addition to the glass formers (SiO$_2$, Al$_2$O$_3$, and B$_2$O$_3$), the glass substrate will preferably also include at least two alkaline earth oxides, i.e., at least MgO and CaO, and, optionally, SrO and/or BaO. The alkaline earth oxides provide the glass with various properties important to melting, fining, forming, and ultimate use. In terms of concentrations, MgO should be greater than or equal to 1.0 mole percent in order to achieve the various benefits associated with MgO described above. Preferably, the MgO concentration is between 1.6 and 2.4 mole percent. Of the alkaline earth oxides, the CaO concentration in the glass substrate is the largest. CaO enables producing low liquidus temperatures (high liquidus viscosities), high strain points and moduli, and CTE's in the most desired ranges for flat panel applications, specifically, AMLCD applications. It also contributes favorably to chemical durability, and compared to other alkaline earth oxides it is relatively inexpensive as a batch material. Accordingly, the CaO concentration is preferably greater than or equal to 6.0 mole percent. However, at high concentrations, CaO increases density and CTE. Accordingly, the CaO concentration of the glasses of the invention is preferably less than or equal to 11.5 mole percent, and more preferably, the CaO concentration is between 6.5 and 10.5 mole percent.

The glass substrate described in the process can be what is referred to in the art as laminated glass. In one aspect, glass substrate is produced by fusion drawing to at least one exposed surface of a glass core a glass skin. The glass skin will possess a strain point greater than 650° C. In other examples, the skin glass composition can have a strain point greater than 670, 690, 710, 730, 750 770, or 790° C. The strain point of the disclosed compositions can be determined by one of ordinary skill in the art using known techniques. For example, the strain point can be determined using ASTM method C336.

In some examples, the glass skin can be applied to an exposed surface of a glass core by a fusion process. An example of a suitable fusion process is disclosed in U.S. Pat. No. 4,214,886, which is incorporated by reference herein in its entirety. The fusion glass substrate forming process can be summarized as follows. At least two glasses of different compositions (e.g., the base or core glass sheet and the skin) are separately melted. Each of the glasses is then delivered through an appropriate delivery system to an overflow distributor. The distributors are mounted one above the other so that the glass from each flows over top edge portions of the distributor and down at least one side to form a uniform flow layer of appropriate thickness on one or both sides of the distributor. The molten glass overflowing the lower distributor flows downwardly along the distributor walls and forms an initial glass flow layer adjacent to the converging outer surfaces of the bottom distributor. Likewise, molten glass overflowing from the upper distributor flows downwardly over the upper distributor walls and flows over an outer surface of the initial glass flow layer. The two individual layers of glass from each converging sidewall of the two distributors are brought together and fused at the draw line to form a single continuously laminated sheet. The central glass in a two-glass laminate is called the core glass, whereas the glasses flowing down the external surface of the core glass are called skin glasses.

Conversely, when just one skin glass is fused directly to the core, the skin is "adjacent" to the core.

The overflow distributor process provides a fire polished surface to the sheet glass so formed, and the uniformly distributed thickness of the glass provided by the controlled distributor, provides a glass sheet with superior optical quality. The glass substrates formed can have a thickness from 10 μm to 5 mm. Other fusion processes, which can be used in the methods disclosed herein, are described in U.S. Pat. Nos. 3,338,696, 3,682,609, 4,102,664, 4,880,453, and U.S. Published Application No. 2005-0001201, which are incorporated by reference herein in their entireties. The fusion manufacturing process developed by Corning Incorporated offers critical advantages for the display industry, including: one, glass that is flat with excellent thickness control; and two, glass that has a pristine surface quality and scalability. Substrate flatness is particularly critical in the production of panels for liquid crystal display (LCD) televisions as any deviations from flatness can result in distortions.

In another implementation of the described process, the glass substrate will possess a strain point higher than 640° C., CTE in the range of $31$-$57 \times 10^{-7}$/° C., a weight loss less than 20 mg/cm$^2$ after immersion for 24 hours in an aqueous 5% by weight HCl solution at 95° C., that is nominally free from alkali metal oxides and has a composition consisting essentially, calculated in weight percent on the oxide basis, of 49-67% $SiO_2$, at least 6% $Al_2O_3$, $SiO_2$+$Al_2O_3$>68%, 0-15% $B_2O_3$, at least one alkaline earth metal oxide selected from the group consisting of, in the preparations indicated, 0-21% BaO, 0-15% SrO, 0-18% CaO, 0-8% MgO and 12-30% BaO+CaO+SrO+MgO.

Black Matrix Materials

Most types of black matrix materials can be used in the described process, including either photosensitive or non-photosensitive materials. Some of the more preferred types of black matrix materials are polymers, and include epoxy, acrylic, siloxane, and polyimide polymers. Acrylic and polyimide polymers are known to behave more favorably in extended high temperature environments, and generally have greater shelf stability, and thus, can provide certain advantages over the other common black matrix materials. In most instances, photosensitive acrylic polymers would be favored over thermally sensitive acrylic polymers. In that case, a photosensitive black matrix material will include an acrylic, a photo-polymerizable monomer, and a photoinitiator. Nevertheless, the choice of black matrix material will depend upon several factors, including, but not limited to, the selection of adhesion agent, the developing solutions and wash solutions used to etch the black matrix, and the degree to which the adhesion agent interacts with the black matrix material for a given glass substrate.

Some examples of acrylic include copolymers of a plurality of acrylate(s) and/or methacrylate(s) selected from the group consisting of hydrophobic alkyl acrylates and methacrylates such as acrylic acid, methacrylic acid, methyl acrylate and methyl methacrylate; cyclic acrylates and cyclic methacrylates; to relatively more hydrophilic acrylates and methacrylates having a functional group, such as hydroxyethyl acrylate and hydroxyethyl methacrylate. The acrylic may be a copolymer having other monomer(s) such as styrene, alpha-methylstyrene, acrylonitrile, itaconic acid esters and fumaric acid esters. The acrylic polymer will generally have a weight average molecular weight of about 1000 to 200,000.

The photo-polymerizable monomer can include a bifunctional or multifunctional monomer. Some examples of the bifunctional monomer include 1,6-hexanediol diacrylate, ethylene glycol diacrylate, neopentyl glycol diacrylate and triethylene glycol diacrylate, as well as acrylates containing (an) alicyclic structure(s), such as dicyclopentane diene, and acrylates containing (a) polycyclic aromatic ring(s) such as fluorene. Examples of the multifunctional monomer include trimethylolpropane triacrylate, pentaerythritol triacrylate, ditrimethylolpropane tetracrylate, dipentaerythritol penta- and hexaacrylates.

To improve upon the solvent resistance and heat resistance, the black matrix material can also include an epoxy compound or an epoxy curing agent. The acrylic polymer itself may contain an epoxy group. Some examples of the epoxy compound to be used include bisphenol A type epoxy compounds, bisphenol F type epoxy compounds, phenolic novolac epoxy compounds, cresol novolak epoxy compounds, trishydroxyphenyl methane-type epoxy compounds, alicyclic epoxy compounds, glycidyl ester-based epoxy compounds, glycidylamine-based epoxy compounds, heterocyclic epoxy compounds and fluorene-containing epoxy compounds.

It is also understood by those in the art, that there will be an optimum height to the cured, patterned segments of black matrix. The factors to be considered include the color filter application (the type of flat panel display), and the stability of the pattern over the processing conditions. In general, the height of the black matrix layer is from 1.0 μm to 4.0 μm, or from 2.0 μm to 3.0 μm, the latter being particularly favored if the color filter is formed using an ink jet system. When the height of the black matrix layer exceeds 4.0 μm, the strength and pattern accuracy or resolution of the material is potentially compromised. On the other hand, if the height of the black matrix layer is less than 1.0 μm an ink break can easily happen when ink layer is deposited within the patterned matrix wells.

The following examples are put forth so as to provide those of ordinary skill in the art with a complete disclosure and description of how the articles and methods described and claimed are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C., or if not stated, the temperature at which the experiment or measurement is conducted is about room temperature. Pressure is at or near atmospheric unless stated otherwise. There are numerous variations and combinations of reaction conditions, e.g., component concentrations, desired solvents, solvent mixtures, temperatures, pressures and other reaction ranges and conditions that can be used to optimize the product purity and yield obtained from the described process.

EXAMPLES

Example 1

Measurement of Water and Diiodomethane Contact Angles for a Glass Substrate

Water contact angle measurements and diiodomethane contact angle measurements are conducted using a Kruss DSA 3 instrument. When the probe liquid is water, the Kruss DSA instrument dispenses a 2 μL drop of water on the surface of a glass substrate at a rate of 100 μL/min, captures an image, and determines the contact angle of the water droplet against the glass surface using the tangent or circle method. When the probe liquid is diiodomethane, the Kruss DSA instrument dispenses 2 μL volumes. The final contact angle determined is based on the fit of the lines determined by these methods with the actual physically determined water contact angle.

In many instances, treating a glass substrate with the adhesion agent will increase the water contact angle of the glass substrate by at least two times relative to a well-cleaned, non-treated, control glass substrate. Essentially, the application of the adhesion agent will increase the hydrophobic character of a surface of the glass substrate.

As water contact angles do not necessarily define coated surfaces uniquely, other descriptors need to be made. This includes not only the surface energy of the treated surface but how that surface interacts with the black matrix material or developing solutions. The probe liquids, water and diiodomethane have the following surface tension properties. Water has a total surface tension of 72.8 mN/m. The polar component is 46.4 mN/m and the dispersive component is 26.4 mN/m. Diiodomethane has a total surface tension of 50.8 mN/m with the dispersive component being 50.8 mN/m and the polar component being 0.0 mN/m.

The water contact angles for a glass substrate, Lotus® XT from Corning Incorporated, and the glass substrate treated with YSAM C18, were obtained and listed in Table I. One liter aqueous solutions of YSAM C18 were prepared as follows. Deionized water, 990.16 mL, is added to a vessel, and with stirring (a magnetic stir bar is sufficient) 0.48 mL of acetic acid followed by 9.36 mL of YSAM C18 solution (60% YSAM C18, 40% methanol) is added, to make a 0.5 wt % YSAM C18 solution. The aqueous solution is stirred for a total of about 30 minutes. The pH of the solution is about 3.5. The glass substrate is dipped into the solution and maintained in contact with the solution for 30 s at 25° C. or room temperature. The glass substrate is removed from the aqueous silane solution, rinsed for 60 s with deionized water, and dried using a clean, dry air/nitrogen flow.

The contact angles were determined using water and diiodomethane as probe liquids. Ten sample drops of each liquid were measured to determine each contact angle on the glass surface. The control is a clean glass substrate with no surface treatment. The sample and control glass substrates are prewashed with 4% Semiclean KG detergent or air plasma cleaned prior to the treatment. In the plasma cleaning process, substrates were placed in the plasma chamber, air was pumped out to 100 mTorr followed by air introduction at 1 cc/min, maintaining the 100 mTorr chamber pressure, and the plasma was turned on for 15 s.

Using the average contact angle data reported in Table I, the surface energies can be calculated for the glass surfaces and are reported in Table V. The Reference Glass values in Table I are for freshly cleaned "reference glasses".

TABLE I

Water and DIM Contact Angles for Control and YSAM C18 Treated Glass.

| Drop # | Reference Glass Water Contact Angle (°) | Reference Glass Diiodomethane Contact Angle (°) | Treated Glass Water Contact Angle (°) | Treated Glass Diiodomethane Contact Angle (°) |
|---|---|---|---|---|
| 1 | 3.8 | 39.7 | 70.9 | 47.3 |
| 2 | 3.5 | 39.2 | 73.1 | 48.8 |
| 3 | 3.5 | 39.8 | 72.2 | 48.3 |
| 4 | 3.9 | 39.6 | 75.1 | 48.7 |
| 5 | 3.9 | 38.9 | 69.4 | 48.6 |
| 6 | 4.1 | 38.5 | 69.9 | 48.8 |
| 7 | 3.7 | 37.9 | 69.2 | 48.1 |
| 8 | 3.8 | 38.4 | 72.9 | 50.7 |
| 9 | 4.1 | 39.1 | 69.6 | 47.2 |
| 10 | 3.9 | 39.4 | 70.9 | 39.2 |
| 11 | 4.1 | 38.9 | 72.1 | 48.8 |
| 12 | 3.9 | 37.6 | 78.1 | 49.7 |
| Average | 3.9 | 38.9 | 72.0 | 47.9 |
| Std. Dev. | 0.2 | 0.7 | 2.6 | 2.9 |

Example 2

Measurement of Liquid Surface Tensions for Developer Solutions

The surface tension of four developing solutions were determined using a combination of the described contact angle measurements on poly(tertafluoroethylene) (PTFE) and Wilhelmy plate method. This was done as a means of separating each overall surface tension into polar and dispersive components. According to the Fowkes surface energy theory (based on the geometric mean), the dispersive component of a liquid can be determined by knowing its overall surface tension and its contact angle against PTFE (assumed to have a total surface energy of 18 mN/m and no polar component). The lower the contact angle for the liquid on PTFE, the higher the non-polar (dispersive) component of its surface because a non-polar surface will preferentially wet with a non-polar liquid.

The equation used is as follows:

$$\gamma_l^d = \frac{\gamma_l^2(\cos\theta_{PTFE}+1)^2}{72}$$

wherein $\theta_{PTFE}$=the contact angle measured between PTFE and the probe liquid, and the dispersive surface tension component ($\gamma_l^d$) can be determined for any liquid for which the overall surface tension ($\gamma_l$) is known, simply by measuring the contact angle between that liquid and PTFE ($\theta_{PTFE}$), and using the equation above. The polar surface tension component for the liquid is then determined by difference: ($\gamma_l^p = \gamma_l - \gamma_l^d$). A surface polarity can be expressed as a percentage as (%=$\gamma_l^p \times 100/\gamma_l$).

The following contact angle data were collected by placing 5 droplets of each liquid onto PTFE using a Kruss Drop Shape Analysis System DSA10. The contact angles are listed in Table II.

TABLE II

Developer Solution Contact Angles Measured on PTFE.

| Test # | 1.0% KOH PTFE Contact Angle (°) | 0.24% KOH PTFE Contact Angle (°) | 1.0% Na$_2$CO$_3$ PTFE Contact Angle (°) | 0.24% Na$_2$CO$_3$ PTFE Contact Angle (°) |
|---|---|---|---|---|
| 1 | 114.9 | 113.8 | 114.8 | 114.0 |
| 2 | 114.8 | 114.1 | 114.7 | 113.7 |
| 3 | 115.1 | 114.1 | 114.5 | 114.0 |
| 4 | 115.1 | 113.8 | 114.6 | 113.8 |
| 5 | 115.2 | 114.2 | 114.9 | 114.0 |
| Average | 115.0 | 114.0 | 114.7 | 113.9 |
| Std. Dev. | 0.2 | 0.2 | 0.2 | 0.1 |

All of the salt/base solutions have surface tensions and surface polarities which are slightly higher than pure water. This is a common effect of adding ions to water which enhances hydrogen bonding effects in the water. As expected, the surface tensions are higher at 1.0% than at 0.24% with the same salt due to the added salt concentration. The salt solutions will possess relatively low interfacial tensions on a polar (more hydrophilic) surface of a control glass substrate and high interfacial tensions with a less polar (more hydrophobic) surface of a glass substrate treated with an adhesion agent. In regard to the latter, the salt solutions will be more incompatible in terms of surface tension and surface polarity. In contrast, the black matrix material has a low surface polarity and so will be more compatible with the low polarity treated glass surface and less compatible with a more polar untreated (control) glass surface.

The objective, to achieve low interfacial tension and thereby more favorable adhesion, depends on both overall surface energy as well as the surface polarity of the substrate matching the surface polarity of the black matrix material. Using the contact angle data of Table II and the Fowkes model equation above, one can calculate the surface tensions for the listed salt (developing) solutions as well as the interfacial tension between these solutions and the glass substrate.

TABLE III

Surface Tension for Developing Solutions.

| Developer Solution | Overall Surface Tension (mN/m) | Polar Comp. (mN/m) | Dispersive Comp. (mN/m) | Interfacial Tension with Control Glass (mN/m) | Interfacial Tension with Coated Glass (mN/m) |
|---|---|---|---|---|---|
| 1.0% KOH | 73.17 | 48.38 | 24.79 | 2.79 | 27.07 |
| 0.24% KOH | 72.90 | 46.92 | 25.98 | 2.30 | 25.85 |
| 1.0% Na$_2$CO$_3$ | 73.07 | 47.94 | 25.13 | 2.64 | 26.70 |
| 0.24% Na$_2$CO$_3$ | 72.88 | 46.72 | 26.16 | 2.25 | 25.73 |

In accordance with the described method of treating a glass substrate with an adhesion agent, it remains of particular interest for the adhesion agent to increase the interfacial tension between a developing solution and the treated substrate by at least five times, e.g., by at least six times, by at least seven times, or by at least eight times, relative to a non-treated, control glass substrate.

In addition, it is also of interest for the adhesion agent to decrease the interfacial tension between black matrix and the treated substrate by at least three times, e.g., by at five times, by at least seven times, or by at least ten times, relative to a non-treated, control glass substrate.

Example 3

Measurement of Delamination Time for Black Matrix Segment

As demonstrated in FIG. 1, a LOTUS® glass substrate was treated with various adhesion agents, including Virtubond (shown in FIG. 1 as "A"), YSAM C18 (shown in FIG. 1 as "B"), and HMDS (shown in FIG. 1 as "C"). Some of the applied adhesion agents following a 60 second water rinse significantly increased the hydrophobic character of the glass surface as indicated by water contact angles of about 70° or more. Other applied adhesion agents following the same rinse step (shown collectively in FIG. 1 as "0") had significantly less effect on the hydrophobic character of the glass surface.

A variety of methods were utilized to deposit the adhesive agent on the surface of the glass substrate. For hexamethyldisilazane, the disilazane was placed into a petri dish and placed inside a vacuum desiccator. A small glass substrate was elevated above the petri dish. The desiccator was then closed and vacuum pulled for 1 minute, and the substrate sat in a static vacuum for one min. The desiccator was then purged with nitrogen or clean air, the treated glass was then removed and placed onto a hot plate at 140° C. for 3 min to evolve ammonia and strongly bond HMDS to the glass surface. For the alkyl silanes, aqueous solutions were prepared in accordance with Example 1, and the glass substrates were dipped, rinsed and dried as described. For the epoxy silanes, aqueous solutions were prepared in approximately one liter of deionized water and 0.01 mL of 99% glacial acetic acid was added to make pH~5 solution. 3-glycidoxypropyltrimethoxysilane (9.34 mL) was added to make an approximate 1 wt % solution. The mixture was then stirred for 2 h to allow hydrolysis to occur. The glass substrates were dipped, rinsed and dried as already described. For epoxy silanes deposited out of 50/50 ethanol/water, 0.5 ml of 99% glacial acetic acid per 1 L of water was mixed to make a pH~4 solution. In the instance where water/ethanol mixtures were used the appropriate volumes of each solvent were used to make the stated solutions. Again, the glass substrates were then dipped, rinsed and dried as described. For octadecylammonium chloride, 1 g of the alkyl salt was added to 1000 mL of deionized water until dissolved. Again, the glass substrates were dipped, rinsed and dried as described. Octadecanol was evaporated directly from a dish of the molten material (mp 60 degrees C.) onto sample pieces of room temperature glass held above the surface. The glass substrate was typically on the order of a few mm from the dish top edge and 3.5 cm from the surface of the octadecanol. Deposition took place at 90 degrees C. melt temperature for 10 s. Samples of individual liquid silanes (as supplied by Gelest) were transferred to a small petri dish and placed in the bottom of a vacuum desiccator. Sufficient liquid was used, such that there would still be liquid remaining at the end of the treatment cycle (max loss observed was ~1 mL/h). The desiccator shelf was then inserted and clean glass samples were arrayed in a rack on that shelf. The desiccator lid was attached and connected to a Gast™ Oil-Less Diaphragm-Type Pressure/Vacuum Pump (DOAP704AA) and vacuum applied (gauge read approx. 23 in Hg) and maintained for 6 h. After vapor deposition, the vacuum was released and the samples transferred to a pre-heated oven (100° C.) for 10 min. Samples were then cooled and immediately used for analysis or black matrix processing. Silanes deposited by this method were 3-acryloxypropyltrimethoxysilane (Gelest: SIA0200.0) and ethyltrimethoxysilane (Gelest: SIE49010.4).

Following the treating of the glass substrates, black matrix was deposited as follows. The black matrix (Tokyo Ohka Product # CFPR BK-5100NR) was removed from refrigerated storage and allowed to acclimate to room temperature. The black matrix material was spin coated onto the substrates at 1000 rpm for 5 seconds using an initial dose of 8 mL of black matrix for a 5 inch by 5 inch substrate. Following spin deposition, the sample substrate is allowed to solvent evaporate in air for about 2 minutes. Then the sample is heated at 70° C. for 125 s to allow further evaporation of the solvents from the black matrix liquid material. The pattern mask is applied to the substrate, the sample is then UV exposed (I line) at a line width of 5 μm for 1.5 s and the pattern mask removed. The sample is then developed with 500 mL of developing solution (KOH, Na$_2$CO$_3$ or DCD developer) for various times followed by a deionized water rinse in 750 mL for 1 min followed by second a water rinse in 750 mL for 35 s. The samples are then placed on an oven rack and heated for 30 min at 230° C. The amount of time required in the developer solution for delamination of the 5 μm black matrix lines from the treated substrates was measured and compared to the amount of time required for delamination of the 5 μm black matrix lines from the untreated control substrates and reported as the difference between these delamination times in Table IV and FIG. 1. Visual examination of delamination is done by inspecting using transmission or reflecting mode on an optical microscope using magnification of up to 100×.

TABLE IV

Delamination Time Shift and Water Contact Angle for a Variety of Chemistries

| Surface Treatment/Condition | Water Contact Angle | 5 μm line Development Time Shift from Control (s) |
|---|---|---|
| SC-1 1:2:80 | 3.1 | 5.00 |
| Octadecanol | 19.5 | 20.00 |
| (3-Acryloxypropyl)trimethoxysilane | 27.3 | 20.00 |
| (3-Glycidoxypropyl)trimethoxysilane | 13.7 | 15.00 |
| Parker 488A | 3.8 | −15.00 |
| 4% KOH solution with alkaline detergent | 2.0 | −10.00 |
| Semiclean KG | 2.8 | 0.00 |
| SC-1 1:1:5 | 2.8 | −5.00 |
| SC-1 1:2:80 | 2.6 | 5.00 |
| 1:200 HCl | 2.9 | −15.00 |
| SC-1 1:2:80 | 3.4 | 10.00 |
| Plasma O2, Argon | 3.1 | 0.00 |
| HMDS | 74.5 | 125.00 |
| Virtubond ™ | 70.0 | 55.00 |
| 0.5 wt. % YSAM | 70.7 | 90.00 |

Example 4

Cleaning Glass Substrates Following Treatment with Adhesion Agent

To accommodate thinner and thinner segments of patterned black matrix, glass cleanliness becomes more important, and the design specifications, e.g., a maximum particle density, for color filter and TFT grade glass substrates continue to decrease. Essentially, the glass substrate must be substantially free of loose environmental particles. Cleaning methods may include mechanical means such as physical brush washing, ultrasonics, bubble jet, high pressure spray for large (>1 μm particles), or megasonics for submicron particles, as well as chemical means such as detergent, alkali, hot water, steam, etc. for the removal of not only particulate but also organic and/or metallic ion contaminants. Moreover, the sequence of cleaning steps may also be critical. For example, the removal of larger size particulate prior to the removal of smaller size particulate may prove beneficial.

The treatment of a clean glass substrate with an organic-based adhesion agent to enhance black matrix adhesion to the substrate as described herein may be required to survive one or more wash steps so that unwanted organics or particulates may be removed while the adhesive agent is retained. Hence it becomes important to assess the ability of a treated surface to withstand a wash process and retain its objective properties, to provide enhanced black matrix adhesion.

The adhesion agent, YSAM C18, was applied to a LOTUS® glass substrate as described in Example 1 and four different cleaning or wash steps were used to remove excess agent and unwanted particles and organics from the treated substrate. The black matrix ink was deposited and patterned as described in Example 3 except 2 inch×2 inch glass substrates were used. The time versus contact angle data of FIG. 2 represents how well the YSAM C18 agent is maintained on the glass surface following several types of wash or clean steps including air plasma (shown in FIG. 2 as "E"), an aqueous 0.24% KOH solution (shown in FIG. 2 as "F"), an aqueous 4% KOH solution with an alkaline detergent (hereafter, "4% KOH SP") (shown in FIG. 2 as "G"), and water (shown in FIG. 2 as "H").

Again, the developing process included a dipping process in about 500 mL of solution with no physical action. For example, the KOH development was conducted at room temperature. For water wash, the liquid was likewise at room temperature but washing took place under flow of 1 L/min. For detergent wash, 4% KOH SP at 65° C. was used without ultrasonic agitation and without flow. In the plasma cleaning process, substrates were placed in the plasma chamber, air was pumped out to 100 mTorr followed by air introduction at 1 cc/min, maintaining the 100 mTorr chamber pressure, and the plasma was turned on for 15 s.

Figure 2:
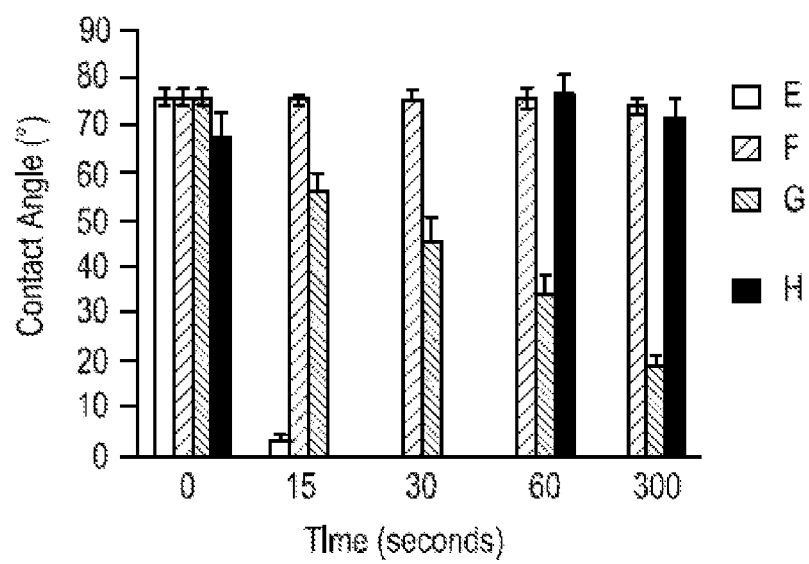
FIG. 2 is a graphical representation of how well the adhesion agent, N,N-dimethyl-N-(3-(trimethoxysilyl)propyl)octadecan-1-ammonium chloride (hereafter, "YSAM C18"), is maintained on a surface of a glass substrate following several types of wash or clean steps including air plasma, KOH solution, alkaline detergent solution and water.

The effect of a water wash at 15 and 30 seconds was not measured since there was little or no change after 60 or 300 seconds and is therefore not shown in FIG. 2. The x-axis shows the length of time each wash or clean solution is in contact with the treated substrate. It is readily seen that YSAM C18 is maintained to a greater extent on the substrate surface following a water wash or a basic KOH wash, than if an air plasma or detergent wash is used.

Example 5

Figure 3:
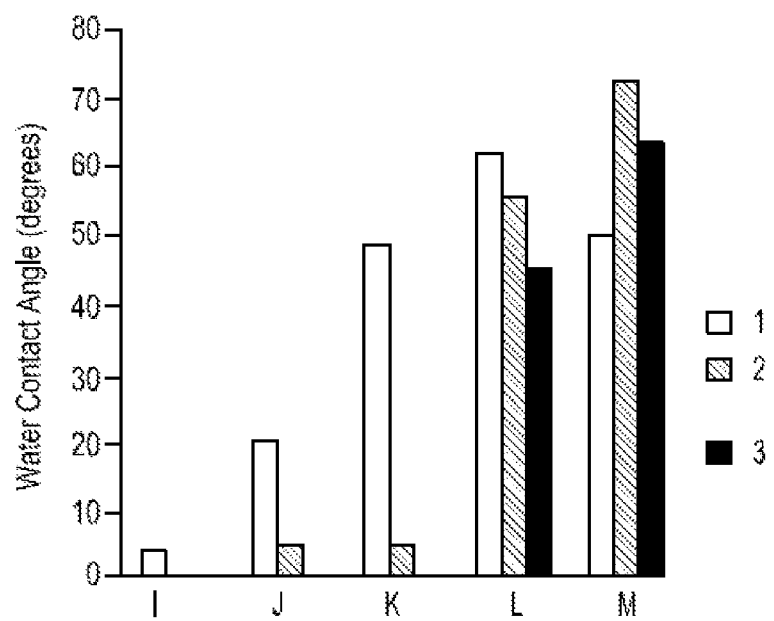
FIG. 3 is a graphical representation of different adhesion agents, i.e., alkyl ammonium compounds with varying alkyl chain length, and how each compound is maintained on a glass substrate surface for three different washing process cycles.

Cleaning Glass Substrates Following Treatment with Alkyl Ammonium Salt Adhesion Agents The adhesion agents, octadecyl (C18) trimethyl ammonium chloride (shown in FIG. 3 as "M"), hexadecyl (C16) trimethyl ammonium bromide (shown in FIG. 3 as "L"), dodecyltrimethyl (C12) ammonium bromide (shown in FIG. 3 as "K"), and hexyltrimethyl (C6) ammonium bromide (shown in FIG. 3 as "J") were separately applied to a LOTUS® glass substrates as described in Example 3, as compared to a substrate that was plasma cleaned only (shown in FIG. 3 as "I"). For each applied adhesion agent three different wash cycles were used to determine the extent to which each agent is maintained on the substrate surface for each wash cycle. Wash Cycle 1: a 0.1% KOH solution is applied for one minute (shown as "1" in FIG. 3). Wash Cycle 2: wash cycle 1 plus a water rinse for one minute (shown as "2" in FIG. 3). Wash Cycle 3: wash cycle 1 plus 4% KOH SP at 65° C. for one minute, followed by a one minute water rinse (shown as "3" in FIG. 3).

FIG. 3 provides a very strong indication that the lower alkyl chain ammonium salts, i.e., the C6 and C12 ammonium alkyls, are not maintained on the glass surface—the C6 alkyl exhibiting poor survivability even in the one minute water wash. In contrast, the C16 and C18 ammonium alkyls exhibit acceptable maintenance performance for all three wash cycles.

Example 6

Comparing Delamination Times of Treated Surfaces in Developer Solutions

Figure 4:
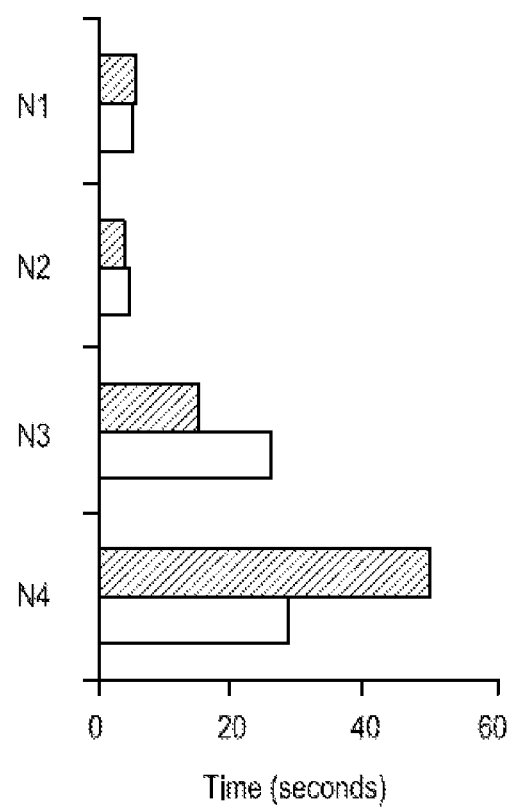
FIG. 4 is a graphical representation of observed differences in delamination time for two adhesion agents, octadecyl ammonium chloride and YSAM C18, that are applied to a glass substrate, followed by contacting the treated surface with two different developer solutions.

Time delamination measurements for 5 μm black matrix segments on LOTUS® glass substrates were conducted using two different adhesion agents, YSAM C18 and octadecyl (C18) trimethyl ammonium chloride (OC18 TMAC), with two different developing solutions, 0.24 wt % KOH and 1 wt % sodium carbonate ($Na_2CO_3$) in contact with the substrate (with OC18 TMAC+KOH shown in FIG. 4 as "N1", OC18 TMAC+$Na_2CO_3$ shown in FIG. 4 as "N2", YSAM C18+KOH shown in FIG. 4 as "N3", and YSAM C18+$Na_2CO_3$ shown in FIG. 4 as "N4"). As shown in FIG. 4, the C18 alkyl ammonium chloride exhibits some black matrix adhesion benefit by extending delamination times in both developer solutions by about 4 to 5 seconds longer than the untreated control substrate. In contrast, YSAM C18 exhibits much longer delamination times in each developing solution, e.g., extending the delamination time by about 50 seconds in the carbonate development solution relative to an untreated control substrate. As shown in FIG. 4, two types of photo masks were used to determine the extension of development time. One photo mask had lines with anchors (shown as "PM1" in FIG. 4) to simulate wells in which an RGB ink could be placed. The other photo mask (shown as "PM2" in FIG. 4) had only lines without anchors to determine the extension of development time.

Accordingly, it is of particular interest for an adhesion agent to provide an article with an increase in delamination time of at least 5 seconds of a test segment with a line width of 5 μm. The delamination time is determined relative to a control article, as described above following contact with a 0.24 wt % potassium hydroxide (KOH) solution. It is to be well understood by a person of skill in the art that a control article is an article that is prepared in the same manner as a test article with the exception that an adhesion agent is not positioned between the glass substrate and the black matrix segment. It is also of particular interest, that an adhesion agent also provides an article with an increase in delamination time of at least 5 seconds of a test segment with a line width of 5 μm following contact with a 1.0 wt % sodium carbonate solution for one minute relative to a control article.

Example 7

Correlation Between Overall Surface Energy and Line Survivability

Overall surface energies of some exemplary glass substrate surface treatments were calculated using the Wu model, as described above, and compared to 4 μm line survivability of the surface treatment at 150 seconds. The results are set forth in Table V.

TABLE V

Surface Characteristics of Glass Substrate Surface Treatments

| Surface Treatment on LOTUS ® Glass | Overall Surface Energy (mN/m) | Polar Component (mN/m) | Dispersive Component (mN/m) | Surface Polarity (%) | 4 μm Line Survivability at 150 s (%) |
|---|---|---|---|---|---|
| Control | 79.9 | 39.2 | 40.7 | 49.1 | 0 |
| YSAM C18 | 49.2 | 12.7 | 36.5 | 25.9 | 86.9 |
| ethyltrimethoxy-silane | 61.1 | 25.5 | 35.6 | 41.8 | 53.7 |
| acryloxypropyl trimethoxy silane | 54.5 | 18.5 | 36.0 | 33.9 | 61.5 |

From the surface energy data of Table V one notices that in general, surfaces that reduce the overall surface energy below approximately 65 mN/m or 65 mJ/m$^2$ are of particular interest. In addition, one also notices a significant change in the polar component of the surface energy for each of the treated glass substrates. The agents, which we refer to as YSAM C18 and YSAM C14 (see below), have at least a 50% reduction in the polar component. In fact, YSAM C18 exhibits about a 90% reduction in the polar component, and about a 50% reduction in the overall surface energy relative to the control substrate. In accordance with these measurements, an adhesion agent that can reduce the polar component of surface energy of a treated glass substrate by at least 30%, at least 40%, by at least 50%, by at least 65%, or by at least 80%, relative to a non-treated, control glass substrate is of particular interest. In addition, from the measurement of water and DIM contact angles one can define a term "surface polarity". The surface polarity is a percent ratio defined as the {[calculated polar component]/[overall surface energy]}×100. The surface polarity is a ratio that is associated with the polar character of a surface of a glass substrate. As indicated in Table V, the control substrate having a more hydrophilic surface is expected to have a relatively high surface polarity. In contrast, the substrate treated with an adhesion agent is expected to have a lower surface polarity. In accordance with calculated surface polarity, an adhesion agent that provides a surface polarity of 35% or less is of interest, e.g., a surface polarity of from 5% to 35%. Of greater interest, is for an adhesion agent to provide a surface polarity of 30% or less, of 20% or less, of 15% or less, or of 10% or less. An adhesion agent that provides a surface polarity in the range of 10% to 25% is of particular interest. Again, values of surface polarity are obtained by measurement of water and DIM contact angles—a method of measurement well known to persons of skill in the art of characterizing surface properties of any substrate or film. The data was extracted using the Wu model.

Adhesion of black matrix to the glass surface correlates to the surface energy of the treated glass substrate. Dispersive, polar and total surface energy (mN/m) were determined for a series of surfaces using two fluid contact angle measurements with H$_2$O and DIM. Surface energy values are based on calculations from the Wu Model. It is understood that the use of other models (such as geometric mean) will result in different absolute values but exhibit the same trend. In Table IV, HDMS, octadecanol, acryloxypropyl TMS, and ethyltrimethyoxysilane were applied in accordance with the vapor deposition methods described above. Rain-X and YSAM were applied in accordance with solution deposition methods as described above. CH$_4$ plasma was applied in accordance with plasma deposition methods as described above, wherein four passes of atmospheric plasma (AP) were made using a plasma jet.

TABLE VI

Calculated Wu Model Surface Energies and
Line Survivability of Surfaces

| Surface | D (mN/m) | P (mN/m) | T (mN/m) | 4 µm Line Survivability at 150 s (%) |
|---|---|---|---|---|
| 10% Rain-X | 31.9 | 4.8 | 36.7 | 0.0 |
| HMDS | 29.4 | 11.6 | 40.9 | 83.9 |
| CH$_4$ Plasma | 42.8 | 2.9 | 45.7 | 76.9 |
| 0.1% YSAM | 36.2 | 10.9 | 47.2 | 86.9 |
| acryloxypropyl TMS | 36.0 | 18.5 | 54.5 | 61.5 |
| Octadecanol | 37.0 | 21.6 | 58.6 | 0.0 |
| ethyltrimethoxysilane | 35.6 | 25.5 | 61.1 | 53.7 |
| Control Lotus XT | 40.5 | 39.3 | 79.8 | 0.0 |

Figure 5:
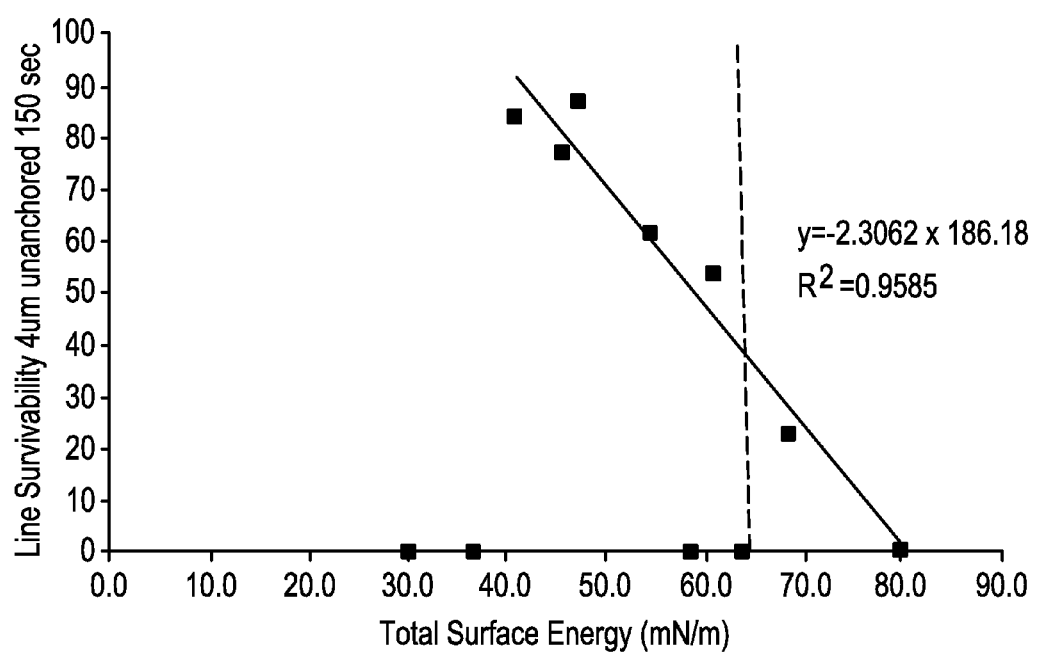
FIG. 5 is a graphical representation of black matrix adhesion performance determined by the percentage of 4 μm unanchored black matrix lines which remain adhered to the glass surface after 150 seconds of exposure to an alkaline developer solution as a function of total surface energy. The linear regression applies only to surface treatments which are covalently bound to the glass surface.

FIG. 5 shows correlation between total surface energy for covalently bonded adhesion agents and the resulting 4 µm unanchored line survivability at 150 s in DCD developer. FIG. 5 also shows data for select treatments with line survivability of 0% which is attributed to the lack of covalent bonding between the adhesion promoter and the glass in those cases.

In addition, the above surface energy measurements demonstrate that an adhesion agent that can reduce the overall surface energy of a treated glass substrate by at least 15%, by at least 25%, or by at least 40%, relative to a non-treated, control glass substrate is of particular interest. Ideally, one would like to observe a decrease in the polar component as well as a decrease in the overall surface tension of a treated glass substrate, particularly, in the instance where the black matrix material has a hydrophobic character as described above and utilized in the process.

Example 8

Correlation Between Overall Surface Energy and Delamination Time

Overall surface energies and delamination times were calculated as described above and compared for exemplary surface treatments as set forth in Table VII below.

As one can see from the surface energy data of Table VII, there is little or no difference in the polar component and the overall surface tension for the control glass substrate, LOTUS® by Corning, and the glass substrate treated with an epoxy silane or YSAM C1. The data of Table VII is consistent with the data of FIG. 1, which demonstrates that YSAM C1 has little effect on increasing the water contact angle of the glass substrate, and consequently, has little or no effect on improving delamination times. One could find it advantageous, however, to utilize such adhesion agents with black matrix ink compositions having greater hydrophilic character or reactive functionality, particular for the epoxy silane.

TABLE VII

Surface Characteristics of Glass Substrate with Surface Treatments

| Lotus ® with Silane Agent | Overall Surface Energy (mN/m) | Polar Component (mN/m) | Dispersive Component (mN/m) | Surface Polarity (%) | 5 µm line Delamination time (s) |
|---|---|---|---|---|---|
| Control | 79.9 | 39.2 | 40.7 | 49.1 | $t_0$ |
| Epoxy Silane (95/5 EtOH/Water) | 71.6 | 31.0 | 40.6 | 43.0 | $t_0 + 23.6$ |
| Epoxy Silane (50/50 (EtOH/Water) | 70.8 | 29.7 | 41.0 | 42.0 | $t_0 + 21.6$ |
| Epoxy Silane (Water) | 70.8 | 29.5 | 41.3 | 41.6 | $t_0 + 11.5$ |
| YSAM C1 | 76.7 | 35.0 | 41.6 | 45.7 | $t_0 + 0$ |

Example 9

Work of Adhesion for Different Developer Solutions

Table VIII lists the calculated work of adhesion of black matrix to the glass substrate in a developer solution ($W_{l12}$), and the corresponding f factor in the presence of three different developing solutions using LOTUS® glass available from Corning Incorporated.

Surfaces of a LOTUS® glass substrate were treated with YSAM C18 in accordance with the method described in Example 1, followed by the deposition of black matrix product # CFPR BK-5100NR available from Tokyo Ohka Kogyo Co., Ltd using a spin-coating process. The black matrix was then exposed to developer solution: either 0.24 wt % aqueous potassium hydroxide, 1 wt % aqueous sodium carbonate, or DCD-260CF (DCD), which is a 0.04 wt % KOH solution in water that also includes a proprietary surfactant and is available as a concentrate at 4 wt % KOH from Dongin Semichem Co. Ltd. The delamination times were determined by the method described in Example 3.

TABLE VIII

Calculated Work of Adhesion for Different Development Solutions

| Substrate | Developer Solution | Work of adhesion, $W_{112}$ (mN/m) | Factor f |
|---|---|---|---|
| Control Lotus Glass | 0.24 wt % KOH | 11.03 | 0.15 |
| 0.5 wt % YSAM C18 coated Lotus Glass | 0.24 wt % KOH | 46.22 | 0.76 |
| Control Lotus Glass | 1.0 wt % $Na_2CO_3$ | 12.02 | 0.16 |
| 0.5 wt % YSAM C18 coated Lotus Glass | 1.0 wt % $Na_2CO_3$ | 47.01 | 0.78 |
| Control Lotus Glass | DCD | 0.58 | 0.008 |
| 0.5 wt % YSAM C18 coated Lotus Glass | DCD | 2.97 | 0.05 |

Embodiments disclosed herein can provide for articles and methods wherein an adhesion agent positioned between a glass substrate and black matrix segments provides a total surface energy of the glass substrate of 65 mN/m or less, such as 60 mN/m or less, and further such as 55 mN/m or less, and yet further such as 50 mN/m or less, including from 35 mN/m to 65 mN/m, and further including from 40 mN/m to 60 mN/m as determined by water and diiodomethane contact angle measurements and application of the Wu model as described herein.

Embodiments disclosed herein can provide for articles and methods wherein an adhesion agent positioned between a glass substrate and black matrix segments provides at least a 30% reduction in surface polarity, such as at least a 35% reduction in surface polarity, and further such as at least a 40% reduction in surface polarity, and yet further such as at least a 50% reduction in surface polarity, compared to a control untreated glass surface, as determined by water and diiodomethane contact angle measurements. For example, the adhesion agent may provide at least a 30% reduction in the polar component of the overall surface tension of the glass substrate, such as at least a 35% reduction in the polar component of the overall surface tension of the glass substrate relative to a non-treated control substrate.

Embodiments disclosed herein may also exhibit an increase in delamination time of at least 5 seconds, such as at least 10 seconds, and further such as at least 20 seconds, of a test segment with a line width of 5 μm following contact with a 0.24 wt % aqueous potassium hydroxide solution, relative to a control article.

Embodiments disclosed herein may also exhibit an increase in delamination time of at least 5 seconds, such as at least 10 seconds, and further such as at least 20 seconds, of a test segment with a line width of 5 μm following contact with a 1.0 wt % aqueous sodium carbonate solution, relative to a control article.

Embodiments disclosed herein may also include those in which treating the surface of the glass substrate with the adhesion agent increases the water contact angle of the glass substrate by at least two times, such as at least three times, and further such as at least four times, such as from two to ten times, relative to the non-treated, control glass substrate.

Embodiments disclosed herein may also include treating a surface of the glass substrate with an adhesion agent, wherein the adhesion agent will increase the water contact angle of the glass surface to at least 40°, such as at least 45° and further such as at least 50°, including from 40° to 90°.

Embodiments disclosed herein may also include those in which treating the glass substrate with the adhesion agent increases the interfacial tension between a developing solution and the treated glass substrate by at least five times, such as at least ten times, relative to a non-treated, control glass substrate.

Embodiments disclosed herein may also include those in which, after treating the surface of the glass substrate with the adhesion agent and immediately prior to applying the black matrix material to the surface of the glass substrate that is treated with the adhesion agent, the adhesion agent remains on the glass surface in sufficient quantity to provide at least one of: a total surface energy of the glass substrate of 65 mN/m or less, and at least a 30% reduction in surface polarity compared to a control untreated glass surface. Such embodiments may, for example, include those in which a cleaning procedure is applied to the glass substrate subsequent to treating the surface of the glass substrate with the adhesion agent and prior to applying the black matrix material to the surface of the glass substrate that is treated with the adhesion agent.

It will be apparent to those skilled in the art that various modifications and variations can be made without departing from the spirit and scope of the claims.

What is claimed is:
1. A patterned article comprising:
a glass substrate;
black matrix segments; wherein the black matrix segments are in the form of a pattern and at least one of the segments has a line width of less than 8 μm; and
an adhesion agent positioned between the glass substrate and the black matrix segments, wherein the adhesion agent provides at least one of: a total surface energy of the glass substrate of 65 mN/m or less; and at least a 30% reduction in surface polarity compared to a control untreated glass surface, as determined by water and diiodomethane contact angle measurements.

2. The article of claim 1 wherein the adhesion agent provides at least a 30% reduction in the polar component of the overall surface tension of the glass substrate relative to a non-treated control substrate.

3. The article of claim 1 wherein the black matrix segments in the first direction, or the black matrix segments in the second direction, have a line width in the range of 2 μm to 4 μm.

4. The article of claim 1 wherein the adhesion agent is a fatty chain functional organic selected from the group consisting of alkyl amine, alkyl alcohol, alkyl epoxy, alkyl acid, and alkyl silane.

5. The article of claim 1 wherein the adhesion agent is a substituted alkyl silane.

6. The article of claim 5 wherein the substituted alkyl silane includes a functional group selected from the group consisting of a quaternary nitrogen, an ether and a thioether, and a pendent ($C_6$-$C_{30}$)alkyl that extends from the functional group.

7. The article of claim 5 wherein the substituted alkyl silane includes a quaternary nitrogen and a pendent ($C_{10}$-$C_{24}$)alkyl.

8. The article of claim 1 that exhibits an increase in delamination time of at least 5 seconds of a test segment with a line width of 5 μm following contact with a 0.24 wt % aqueous potassium hydroxide solution, relative to a control article.

9. The article of claim 8 that exhibits an increase in delamination time of at least 5 seconds of a test segment with a line width of 5 μm following contact with a 1.0 wt % aqueous sodium carbonate solution, relative to a control article.

10. A flat panel display comprising the patterned article of claim 1.

11. The flat panel display of claim 10 wherein the patterned article is a color filter array.

12. A method of improving the adhesion of black matrix on a glass substrate, the method comprising:
providing a glass substrate;
treating a surface of the glass substrate with an adhesion agent, wherein the adhesion agent provides a total surface energy of 65 mN/m or less as determined by water and diiodomethane contact angle measurements;
applying a black matrix material to the surface of the glass substrate that is treated with the adhesion agent; and
creating a pattern within the black matrix material, wherein the pattern includes black matrix segments and at least one of the black matrix segments has a line width less than 8 μm.

13. The method of claim 12, wherein after treating the surface of the glass substrate with the adhesion agent and immediately prior to applying the black matrix material to the surface of the glass substrate that is treated with the adhesion agent, the adhesion agent remains on the glass surface in sufficient quantity to provide at least one of: a total surface energy of the glass substrate of 65 mN/m or less, and at least a 30% reduction in surface polarity compared to a control untreated glass surface.

14. The method of claim 13, wherein the method further comprises applying a cleaning procedure to the glass substrate subsequent to treating the surface of the glass substrate with the adhesion agent and prior to applying the black matrix material to the surface of the glass substrate that is treated with the adhesion agent.

15. The method of claim 12 wherein treating the surface of the glass substrate with the adhesion agent provides at least a 30% reduction in the polar component of the overall surface energy of the glass substrate as determined by water and diiodomethane contact angle measurements relative to a non-treated, control glass substrate.

16. The method of claim 12 wherein treating the surface of the glass substrate with the adhesion agent increases the water contact angle of the glass substrate by at least two times relative to the non-treated, control glass substrate.

17. The method of claim 12, wherein the adhesion agent is applied using a plasma deposition method.

18. A method of improving the adhesion of black matrix on a glass substrate, the method comprising:
providing a glass substrate;
treating a surface of the glass substrate with an adhesion agent, wherein the adhesion agent will increase the water contact angle of the glass surface to at least 40°;
applying black matrix to the surface of the glass substrate that is treated with the adhesion agent; and
creating a pattern within the black matrix, wherein the pattern includes one or more black matrix segments and at least one or more black matrix segments has a line width of less than 8 μm.

19. The method of claim 18 wherein treating the surface of the glass substrate with the adhesion agent provides at least one of: a total surface energy of the glass substrate of 65 mN/m or less; and at least a 30% reduction in surface polarity compared to a control untreated glass surface, as determined by water and diiodomethane contact angle measurements.

20. The method of claim 18 wherein treating the glass substrate with the adhesion agent increases the interfacial tension between a developing solution and the treated glass substrate by at least five times relative to a non-treated, control glass substrate.

* * * * *